United States Patent
Sato et al.

(10) Patent No.: US 11,237,275 B2
(45) Date of Patent: Feb. 1, 2022

(54) POSITIONING SATELLITE SELECTION DEVICE, POSITIONING INFORMATION TRANSMITTING DEVICE, AND POSITIONING SYSTEM

(71) Applicant: Mitsubishi Electric Corporation, Chiyoda-ku (JP)

(72) Inventors: Yuki Sato, Tokyo (JP); Masakazu Miya, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 419 days.

(21) Appl. No.: 15/758,102

(22) PCT Filed: Sep. 17, 2015

(86) PCT No.: PCT/JP2015/076469
§ 371 (c)(1),
(2) Date: Mar. 7, 2018

(87) PCT Pub. No.: WO2017/046914
PCT Pub. Date: Mar. 23, 2017

(65) Prior Publication Data
US 2018/0252818 A1 Sep. 6, 2018

(51) Int. Cl.
*G01S 19/28* (2010.01)
*G01S 19/07* (2010.01)
*G01S 19/08* (2010.01)

(52) U.S. Cl.
CPC ............ *G01S 19/28* (2013.01); *G01S 19/071* (2019.08); *G01S 19/08* (2013.01)

(58) Field of Classification Search
CPC ..... G01S 19/28; G01S 19/33; G01S 19/05–06
See application file for complete search history.

(56) References Cited

U.S. PATENT DOCUMENTS

| 4,928,107 A | 5/1990 | Kuroda et al. |
| 6,650,288 B1 * | 11/2003 | Pitt ......................... G01S 19/05 342/357.42 |

(Continued)

FOREIGN PATENT DOCUMENTS

| JP | 01-320485 A | 12/1989 |
| JP | 10-253740 A | 9/1998 |

(Continued)

OTHER PUBLICATIONS

Australian Office Action dated Oct. 29, 2018 in Australian Patent Application No. 2015409237, 4 pages.

(Continued)

*Primary Examiner* — Cassi J Galt
(74) *Attorney, Agent, or Firm* — Obion, McClelland, Maier & Neustadt, L.L.P.

(57) ABSTRACT

A positioning satellite selection device that obtains a selection combination of positioning satellites used for positioning of a positioning target, and includes: a positioning data acquisition unit that acquires positioning data or navigation information, a range observation value, and an error correction value of this range observation value of a positioning satellite; a satellite position calculator that calculates a satellite position of the positioning satellite from the navigation information; a quality evaluation unit that evaluates quality of the positioning data; a shortest time designation unit that sets a shortest selection time during which the positioning satellite is selected to a larger value as poorer the quality; a plan creator that obtains the selection combination by selecting a positioning satellite conditioned on selecting for longer than the shortest selection time; and a plan storage that stores a plan of the selection combination of positioning satellites.

12 Claims, 11 Drawing Sheets

(56) References Cited

U.S. PATENT DOCUMENTS

| | | | |
|---|---|---|---|
| 7,295,155 B2* | 11/2007 | Wakamatsu | G01S 19/28 340/988 |
| 7,839,332 B2* | 11/2010 | Chen | G01S 19/28 342/357.67 |
| 9,244,172 B2* | 1/2016 | O'Connor | G01S 19/05 |
| 2004/0078140 A1 | 4/2004 | Rowitch et al. | |
| 2005/0068229 A1* | 3/2005 | Moilanen | G01S 19/06 342/357.42 |
| 2005/0101272 A1 | 5/2005 | Rowitch et al. | |
| 2012/0056783 A1 | 3/2012 | Chiu | |

FOREIGN PATENT DOCUMENTS

| | | |
|---|---|---|
| JP | 2004-077228 A | 3/2004 |
| JP | 2005-181051 A | 7/2005 |
| JP | 2006-504097 A | 2/2006 |
| JP | 2006-126181 A | 5/2006 |
| JP | 2006-240593 A | 9/2006 |
| JP | 2009-276198 A | 11/2009 |
| JP | 2010-054469 A | 3/2010 |
| JP | 2010-151725 A | 7/2010 |
| JP | 2010-163118 A | 7/2010 |
| JP | 2012-103021 A | 5/2012 |
| JP | 2014-153087 A | 8/2014 |
| JP | 2014-219204 A | 11/2014 |

OTHER PUBLICATIONS

Extended European Search Report dated Mar. 29, 2019 in European Patent Application No. 15904103.7, citing document AA therein, 8 pages.

European Office Action dated Feb. 12, 2020, in Patent Application No. 15 904 103.7, 6 pages.

International Search Report dated Dec. 22, 2015 in PCT/JP2015/076469, filed on Sep. 17, 2015.

* cited by examiner

POSITIONING SATELLITE SELECTION DEVICE, POSITIONING INFORMATION TRANSMITTING DEVICE, AND POSITIONING SYSTEM

TECHNICAL FIELD

The present invention relates to a positioning system and a positioning device that use positioning satellites such as the Global Positioning System (GPS) and the like.

BACKGROUND ART

In measuring a position (positioning) of a positioning target by using positioning satellites, it is important to appropriately determine a combination of satellites to be used for positioning. The quality of the position which is the accuracy and precision of the position of the positioning target depends on the quality of a range observation value for each satellite. Thus, it is desirable that a satellite with a large observation error be excluded from being used. Also, the number of required channels and the positioning computation load increase as the number of satellites to be used increases, so that it is desirable to determine the upper limit on the number of satellites in accordance with the number of channels and computation capacity available at a terminal, and selectively use a combination of satellites that will result in the best quality of the position of the positioning target.

It is expected that in 2020 more than 100 positioning satellites including the Global Positioning System (GPS), quasi-zenith satellites of Japan, GLONASS of Russia, Beidou of China, and Galileo of Europe will be orbiting the earth, and that approximately 30 of them will be always available for use in Asia and Oceania. On the other hand, the number of channels at a positioning terminal varies widely with the cost, ranging from 10 or so to more than 200 channels. It is important, especially for a terminal with a small number of channels, to determine a selection combination of satellites from which to receive signals. Similarly, also in a positioning service that generates differential error correction information and provides it to a user, the number of satellites for which error correction can be performed has restrictions according to the line capacity, so that it is desirable that a service provider determine a combination of satellites that will result in the best quality of the position of the user terminal.

To determine the combination of satellites to be used for positioning, consideration is given, for example, to a precision deterioration index (DOP: Dilution of Precision) determined from elevation angles, visibility times, and the quality of observation values of individual satellites and a geometric arrangement based on a combination of satellites. As a conventional technology related to this, for example, Patent Literature 1 proposes a train position detecting system in which, in order to reduce a multipath error in detecting a train position, a combination of positioning satellites that will minimize an error between a position calculated at a reference station and a predetermined true position is determined and information on the combination is provided to a train, and the train selects signals of the satellites included in the information on the combination from among received satellite signals and performs positioning.

CITATION LIST

Patent Literature

Patent Literature 1: JP 2010-163118 A

SUMMARY OF INVENTION

Technical Problem

A conventional positioning system determines a combination of satellites at each time based on independent evaluation on a per-time basis, so that a satellite which is used for a short duration of time may be selected into the combination of satellites. If a satellite which cannot be used continuously by a positioning filter on a terminal side is selected, there is a problem that the time necessary for reducing an error in positioning data of the satellite cannot be secured resulting in a large error, so that stable positioning cannot be performed.

It is an object of the present invention to perform stable positioning (by securing the time required for reducing an error in positioning data of a satellite) when positioning is performed by selecting satellites to be used from among a large number of positioning satellites.

Solution to Problem

A positioning satellite selection device according to the present invention obtains, from signals transmitted from a plurality of positioning satellites, a selection combination at each time of the positioning satellites to be used for positioning at a position of a positioning target, the positioning satellite selection device, and includes a positioning data acquisition unit to acquire positioning data including navigation information and a range observation value of the plurality of the positioning satellites; a satellite position calculation unit to calculate a satellite position at each time of the positioning satellite from the navigation information of the positioning data; a quality evaluation unit to obtain a quality evaluation value by evaluating quality of the positioning data; a shortest time designation unit to set a shortest selection time which is a shortest time during which the positioning satellite is selected to a larger value as the quality evaluation value is poorer; a plan creation unit to obtain the selection combination at each time on a condition of selecting for longer than the shortest selection time, by using, as an evaluation criterion, a precision degradation index obtained from a geometric arrangement in the sky at each time calculated from the satellite positions of a plurality of the positioning satellites; and a plan storage unit to store a plan of the selection combination at each time of the positioning satellite. The positioning satellite selection device can obtain a selection combination of positioning satellites to make a positioning device perform stable positioning.

A positioning device according to the present invention includes a positioning data acquisition unit to acquire positioning data including navigation information and a range observation value of a plurality of positioning satellites; a satellite position calculation unit to calculate a satellite position at each time of the positioning satellite from the navigation information of the positioning data; a quality evaluation unit to obtain a quality evaluation value by evaluating quality of the positioning data; a shortest time designation unit to set a shortest selection time which is a shortest time during which the positioning satellite is selected to a larger value as the quality evaluation value is poorer; a plan creation unit to plan a selection combination at each time of the positioning satellites to be used for positioning on a condition of selecting for longer than the shortest selection time of the positioning satellite by using, as an evaluation criterion, a precision degradation index obtained from a geometric arrangement in the sky at each time calculated from the satellite positions of a plurality of the positioning satellites; a plan storage unit to store a plan of the selection combination at each time of the positioning satellites; and a positioning computation unit to acquire the plan of the selection combination at each time of the positioning satellites from the plan storage unit, and perform a computation to measure a position by using the positioning data of the positioning satellites included in the selection combination. The positioning device can perform stable positioning.

A positioning system according to the present invention includes a positioning information transmitting device and a positioning terminal, and the positioning information transmitting device includes a positioning data acquisition unit to acquire positioning data from a reference station which acquires from a plurality of positioning satellites the positioning data including a range observation value and navigation information of each positioning satellite; a satellite position calculation unit to calculate a satellite position at each time of the positioning satellite from the navigation information included in the positioning data; a correction data generation unit to generate correction data for correcting an error included in the positioning data of the positioning satellite; a quality evaluation unit to obtain a quality evaluation value by evaluating quality of the correction data; a shortest time designation unit to set a shortest selection time which is a shortest time during which the positioning satellite is selected to a larger value as the quality evaluation value is poorer; a plan creation unit to plan a selection combination at each time of the positioning satellites to be used for positioning on a condition of selecting for longer than the shortest selection time of the positioning satellite, by using, as an evaluation criterion, a precision degradation index obtained from a geometric arrangement in the sky at each time calculated from the satellite positions of the plurality of the positioning satellites; a plan storage unit to store the selection combination at each time of the positioning satellites; and a correction data output unit to output the positioning satellites included in the selection combination at each time and the correction data for these positioning satellites, and the positioning terminal includes a terminal positioning data acquisition unit to acquire the range observation value and the navigation information of the positioning satellite at the positioning terminal; a correction data acquisition unit to acquire the correction data of the positioning satellite from the positioning information transmitting device; and a positioning computation unit to calculate a position by using the range observation value that has been corrected with the correction data of the positioning satellite. The positioning system can perform stable positioning.

Advantageous Effects of Invention

According to the present invention, even when there are restrictions on the number of channels and the positioning computation load, the duration during which a satellite is selected is longer than the time required for reducing an error in positioning data of the satellite, so that stable positioning can be performed.

DESCRIPTION OF EMBODIMENTS

First Embodiment

Figure 1:
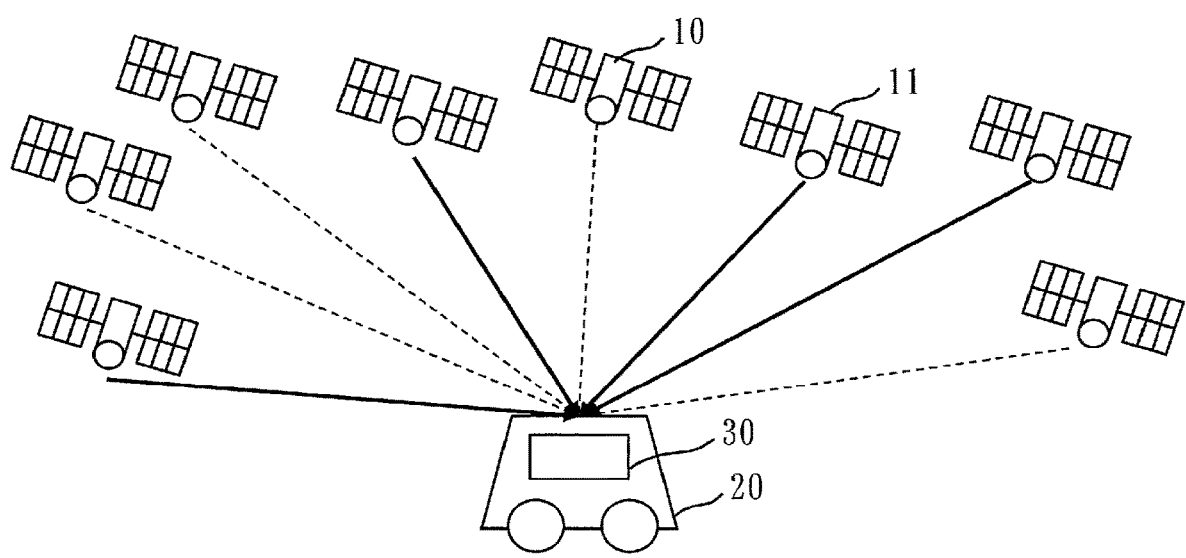
FIG. 1 is a diagram illustrating an example configuration of a positioning system according to a first embodiment of the present invention.

A conventional positioning system determines a combination of satellites at each time based on independent evaluation on a per-time basis. For this reason, if the number of selected satellites is small relative to the number of positioning satellites to be evaluated, there arise significant temporal changes in the combination, so that a positioning filter on a terminal side cannot use individual satellites continuously. In particular, in real-time kinematic positioning (RTK: Real Time Kinematic) and precise point positioning (PPP) using a carrier phase observation amount, if the duration during which individual positioning signals are used is short relative to the magnitude of observation errors, carrier phase ambiguity (indefiniteness of an integral multiple of a wavelength) cannot be determined due to a random error component. Thus, it is not possible to perform positioning on the order of centimeters utilizing a highly precise carrier phase observation amount.

In particular, in the real-time kinematic positioning (RTK: Real Time Kinematic), the precise point positioning (PPP), and the like using the carrier phase observation amount, there is a problem that the carrier phase ambiguity cannot be determined due to the random error component and thus high precision positioning cannot be performed.

According to the present invention, even when there are restrictions on the number of channels and the positioning computation load, the duration during which a satellite once selected to be used for positioning continues to be selected is longer than the time required for reducing an error in positioning data of the satellite, so that stable positioning can be performed. In positioning using the carrier phase observation amount, it is possible to secure the time required for determining the carrier phase ambiguity according to the quality of the positioning data of the satellite and thus perform stable positioning on the order of centimeters.

It is an object of the present invention to reduce temporal changes in a combination of satellites to be used so as to perform stable positioning when positioning is performed by selecting the satellites to be used from among a large number of positioning satellites.

In positioning using the carrier phase observation amount, it is possible to secure the time required for determining the carrier phase ambiguity according to the quality of the positioning data of the satellite and perform stable positioning on the order of centimeters.

According to the present invention, even when there are restrictions on the number of channels and the positioning computation load, the duration during which a satellite once selected for positioning continues to be selected is longer than the time required for reducing an error in positioning data of the satellite, so that stable positioning can be performed. There is provided a significant effect not available conventionally that in positioning using the carrier phase observation amount, it is possible to secure the time required for determining the carrier phase ambiguity according to the quality of the positioning data of the satellite and perform stable positioning on the order of centimeters.

FIG. 1 is a diagram illustrating an example configuration of an entire system including a positioning device 30 according to the first embodiment of the present invention. As illustrated in FIG. 1, the positioning device 30 of this embodiment is a device that receives a signal of a positioning satellite 10 and measures a position of a positioning target 20. There are a plurality of the positioning satellites 10 in the sky, and the positioning device 30 selects a plurality of selected positioning satellites 11 actually used for positioning from among the plurality of the positioning satellites 10 and measures the position of the positioning target 20. The positioning target 20 is a moving object such as, for example, a car, a motorcycle, a train, or an airplane.

Figure 2:
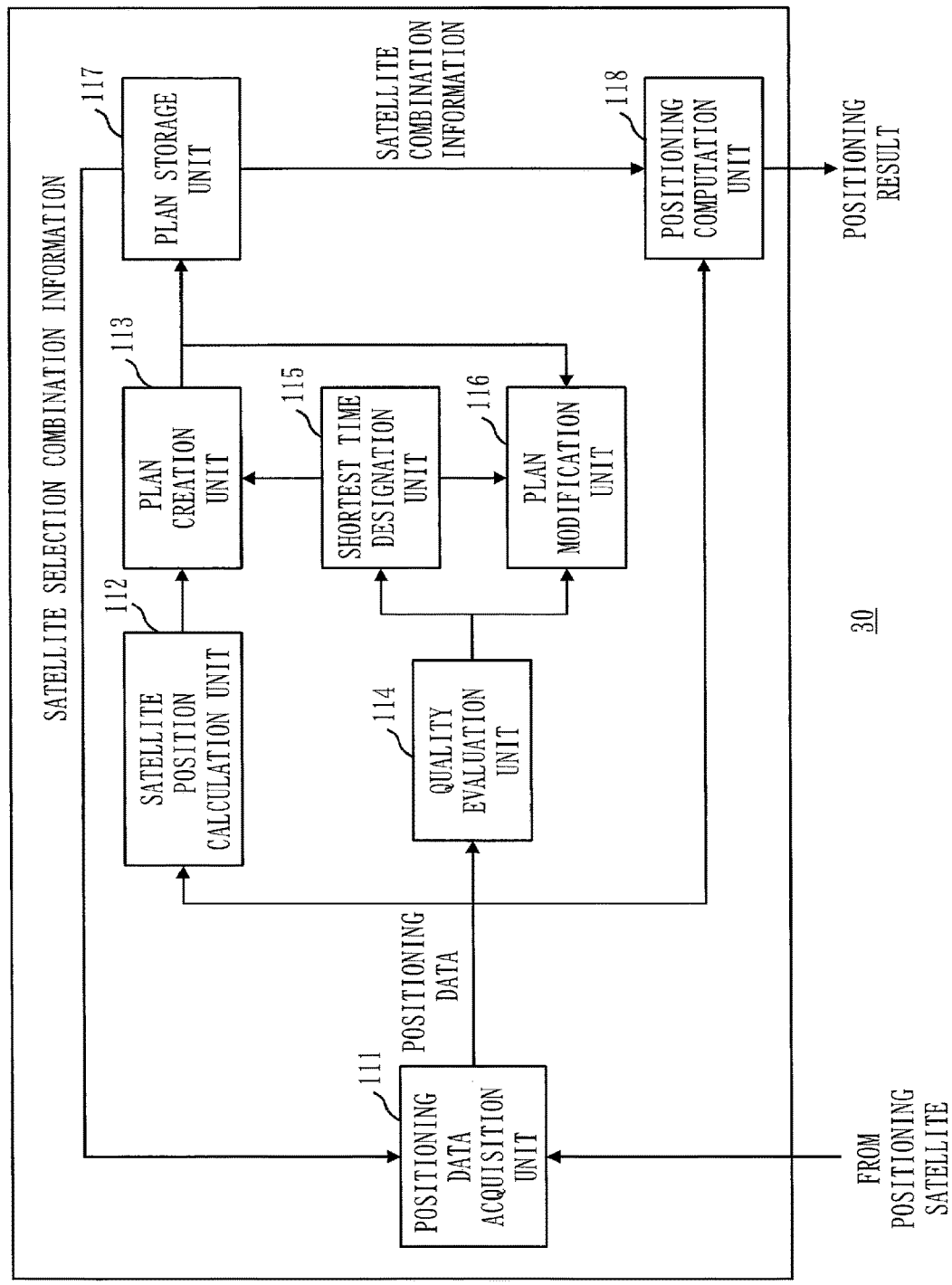
FIG. 2 is a block diagram illustrating an example configuration of a positioning device according to the first embodiment of the present invention.

FIG. 2 is a block diagram illustrating a configuration of the positioning device 30 according to this embodiment. The positioning device 30 includes a positioning data acquisition unit 111 that acquires positioning data from the positioning satellites 10 and 11; a satellite position calculation unit 112 that calculates a three-dimensional position of a satellite at an arbitrary time by using navigation information acquired by the positioning data acquisition unit 111; a quality evaluation unit 114 that evaluates the quality of positioning data; a shortest time designation unit 115 that sets a shortest selection time for the selected positioning satellite 11; a plan creation unit 113 that obtains a selection combination of positioning satellites on the condition that a selection time during which the selected positioning satellite 11 is selected consecutively is longer than the shortest selection time by using, as an evaluation index, a precision degradation index based on a geometric arrangement obtained from the positions of the satellites obtained by the satellite position calculation unit 112; a plan storage unit 117 that stores (in a storage unit) the selection combination as selection combination information: and a positioning computation unit 118 that performs a position measurement computation by using the positioning data of the positioning satellites 11 included in the selection combination information.

The positioning data is data including navigation information, a range observation value, and an error correction value of this range observation value transmitted from the positioning satellites 10 and 11. The shortest time designation unit 115 sets the shortest selection time which is the shortest time during which a positioning satellite is selected to a smaller value as the quality evaluated by the quality evaluation unit 114 is better. Specifically, the quality evaluation unit 114 obtains a quality evaluation value by evaluating the quality, and the shortest time designation unit 115 sets the shortest selection time to a smaller value as the quality evaluation value is better and to a larger value as the quality evaluation value is poorer.

The positioning device 30 may be configured to include a plan modification unit 116 that modifies a plan during a modification time from the current time in accordance with the quality evaluation value, and may be configured such that the modified plan is stored in the plan storage unit 117 and the positioning computation unit 118 acquires the selection combination of satellites from the plan storage unit 117 to perform a computation to measure the position of the positioning device 30 itself by using the positioning data of the positioning satellites 11 included in the combination. By adopting such a configuration, even after the selection combination has been obtained by the plan creation unit 113, the plan is modified by the plan modification unit 116, so that stable positioning can be performed continuously.

Each block will be described below.

The positioning data acquisition unit 111 receives ranging signals transmitted by the positioning satellites 10 and 11, and acquires a range observation value for the positioning satellite 11 and navigation information of the positioning satellites 10 and 11. In doing so, if the number of channels for receiving positioning signals of satellites possessed by the positioning device 30 is smaller than the number of visible satellites, the selection combination at the current time is read from the plan storage unit 117, and ranging signals of the selected positioning satellites 11 included in the selection combination are received preferentially. If the computing capability of the positioning device is lower than the capability for processing all target signals, ranging signals of the selected positioning satellites 11 included in the selection combination are also similarly received preferentially.

The range observation value may be only a pseudorange observation value, or may include both a pseudorange observation value and a carrier phase observation value. There may be signals at only one frequency or signals at two or more frequencies.

The navigation information may be only a navigation calendar (Broadcast Ephemeris) for calculating a high precision position and clock error, or may include both the navigation calendar and an almanac for calculating an approximate position of a satellite. In place of the navigation calendar, high precision orbit and time information provided by IGS (International GNSS Service) or the like may be used.

Using the navigation information acquired by the positioning data acquisition unit 111, the satellite position calculation unit 112 calculates a three-dimensional position of each satellite in the sky at an arbitrary time within the planning target time. The method for calculating the positions of the positioning satellites 10 and 11 from the parameters included in the navigation information is in accordance with the procedure described in the specifications provided by the institution operating each of the positioning satellites 10 and 11.

The plan creation unit 113 obtains a precision degradation index based on a geometric arrangement calculated from the position of each positioning satellite obtained by the satellite position calculation unit 112. The obtained precision degradation index is used to plan a selection combination of satellites at each time, such that the maximum value of the precision degradation index at each time during the target time period from a start time $t_{start}$ to an end time $t_{end}$ is minimized.

At this time, planning is done under the constraint that the shortest time during which each positioning satellite is selected consecutively in time is longer than a time $t_{shortest}$ designated by the shortest time designation unit 115.

The time interval for deciding a selection combination of satellites is, for example, 30 seconds in consideration of changes in the geometric arrangement of the satellites.

As the precision degradation index, PDOP (Position Dilution of Precision) is used, for example. The PDOP at the position of the positioning device 30 is expressed as indicated below using an elevation angle $el_i$ and an azimuth angle $az_i$ with respect to the positioning device 30 which are calculated from the position of a satellite i included in the selection combination. Note that n denotes the number of satellites included in the combination.

[Formula 1]

$$PDOP = \sqrt{q_{11} + q_{22} + q_{33}}$$ (Formula 1)

[Formula 2]

$$Q = (H^T H)^{-1} = \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix}$$ (Formula 2)

[Formula 3]

$$H = \begin{bmatrix} \sin(az_1)\cos(el_1) & \cos(az_1)\cos(el_1) & \sin(el_1) & 1 \\ \vdots & \vdots & \vdots & \vdots \\ \sin(az_i)\cos(el_i) & \cos(az_i)\cos(el_i) & \sin(el_i) & 1 \\ \vdots & \vdots & \vdots & \vdots \\ \sin(az_n)\cos(el_n) & \cos(az_n)\cos(el_n) & \sin(el_n) & 1 \end{bmatrix}$$ (Formula 3)

Here, Q is a covariance matrix determined from an observation matrix H, and q11, q22, and q33 are variances of position estimation values in a horizontal direction (two axes) and in a vertical direction, respectively. When expressed using H, it is $(H^T H)^{-1}$. When expanded, it is represented by a determinant of q11 to q44 as indicated in Formula 2. Using the elevation angle $el_i$ and the azimuth angle $az_i$ with respect to the positioning device 30 which are calculated from the position of the satellite i, H is represented as indicated in Formula (3). Each row vector (1×4) of the H matrix is composed of line-of-sight direction unit vectors (1×3) for each satellite and a numerical value 1 concerning estimation of a receiver clock error.

In place of the PDOP, it is also possible to use HDOP (Horizontal Dilution of Precision) as an index when priority is given to the precision in the horizontal direction, or use VDOP (Vertical Dilution of Precision) as an index when priority is given to the precision in the vertical direction. The HDOP and the VDOP are represented by the following formulas.

[Formula 4]

$$HDOP = \sqrt{q_{11} + q_{22}}$$

$$VDOP = \sqrt{q_{33}}$$ (Formula 4)

That is, the HDOP is obtained by the square root of the sum of q11 and q22, and the VDOP is obtained by the square root of q33.

Considering that one or more satellites of the positioning satellites included in the selection combination may be invisible in reality by, for example, being concealed behind a building, it is also possible to use, as the precision degradation index, the maximum value of DOP (PDOP, HDOP, VDOP) when one or more arbitrary satellites in the selection combination are invisible.

The quality evaluation unit 114 evaluates the quality of the positioning data of each of the positioning satellites 10 and 11 acquired by the positioning data acquisition unit 111, and obtains a quality evaluation value which is an index value for the quality of the positioning data of each satellite. The quality evaluation unit 114 temporarily calculates positioning data and a range observation value for evaluating the quality of the positioning data, rather than positioning data and a range observation value for use in an actual positioning computation. In other words, the range observation value is obtained for quality evaluation, so that the range observation value obtained by the quality evaluation unit 114 will be called a pseudorange observation value herein.

A pseudorange refers to a range between a satellite and a receiver which is obtained by calculating a propagation time until a signal transmitted from the satellite reaches the receiver, from a phase difference between an observation value of a positioning code string (C/A code, P2 code, etc.) placed on a carrier of the signal and a value of the same positioning code string generated by synchronizing the receiver clock with the same reference time as that of the satellite clock, and then multiplying the propagation time by the speed of light. Synchronization of the receiver clock and the satellite clock with the reference time involves errors, so that the obtained range includes an error due to the difference between the clocks. For this reason, it is called the "pseudo" range.

As an evaluation index of the pseudorange observation value, it is possible to use, for example, the least squares residual when positioning is performed by the least squares method using the pseudorange observation values of all positioning satellites, that is, the least squares residual of the pseudorange observation values of all positioning satellites. For the least squares residual of the pseudorange observation values of all positioning satellites, the following formula may be used, for example.

[Formula 5]

$$\vec{v} = -(I - H(H^T R^{-1} H)^{-1} H^T R)\vec{y}$$ (Formula 5)

Here, the y vector is a column vector composed of pseudorange observation values of individual positioning satellites, the v vector is a column vector composed of the least squares residual of the pseudorange observation values of the individual positioning satellites, H is a matrix calculated from the elevation angles and azimuth angles of the individual satellites as in Formula 3, and R is an error matrix of the pseudorange observation values.

As an evaluation index of the carrier phase observation value, a residual before observation update in a Kalman filter may be used, for example. This allows calculation of the evaluation index regardless of whether or not ambiguity has been fixed (a state in which an undefined integer value that is an integral multiple of a wavelength has been solved and can be used as a fixed value).

The carrier phase observation value is a phase difference between the phase of a carrier tracked at the time of observation of a positioning code string used for measuring the pseudorange and the phase of the same carrier signal generated by synchronizing the receiver clock with the same reference time as that of the satellite clock. The phase difference has ambiguity of $2\pi \times N$ (N being the number of waves and an integer value). As the residual before observation update of an L1 carrier phase, the following formula can be used, for example.

[Formula 6]

$$\vec{v} = \vec{y} - h_\Phi(\vec{z}) \quad \text{(Formula 6)}$$

[Formula 7]

$$h = \begin{bmatrix} \sqrt{(x^1-x_r)^2 + (y^1-y_r)^2 + (z^1-z_r)^2} + \delta t_r + \lambda_{L1} N_r^1 \\ \sqrt{(x^i-x_r)^2 + (y^i-y_r)^2 + (z^i-z_r)^2} + \delta t_r + \lambda_{L1} N_r^i \\ \sqrt{(x^n-x_r)^2 + (y^n-y_r)^2 + (z^n-z_r)^2} + \delta t_r + \lambda_{L1} N_r^n \end{bmatrix} \quad \text{(Formula 7)}$$

[Formula 8]

$$\vec{z} = [x_r, y_r, z_r, \delta t_r, N_r^1, \ldots, N_r^i, \ldots, N_r^n]^T \quad \text{(Formula 8)}$$

Here, the y vector is a column vector composed of L1 carrier phase observation values of individual satellites, and the z vector is a column vector composed of state estimation values before observation update by the y vector. Note that $x^i$, $y^i$ and $z^i$ represent the position of an i-th positioning satellite i, and $\lambda_{L1}$ indicates the wavelength of the L1 carrier wave (0.1903 [m]). The z vector includes the position $x_r$, $y_r$, and $z_r$ of the positioning device 30, a clock error $\delta t_r$ converted into meters, and ambiguity $N_r^i$ for the i-th positioning satellite i. Note that the subscript r indicates that it is a term related to the receiver. In Formula 6, $h_\Phi$ denotes an observation model.

Formula (6) indicates the residual before observation update (a difference between an actual observation value and a predicted observation value calculated from the state estimation value before observation update and the observation model). Formula (7) indicates the observation model. Formula (8) indicates the state quantity to be estimated.

The residual before observation update in the Kalman filter as in Formula 6 may be used also as the evaluation index of the pseudorange observation value. By using the residual before observation update, sudden changes in the observation amount at short intervals can be detected. Thus, even when a small number of the positioning satellites 10 and 11 are used, quality degradation due to environmental changes such as strong multipath can be detected.

For a satellite with fixed ambiguity, the least squares residual of Formula 5 may be used also as the evaluation index of the carrier phase observation amount. The evaluation indices of Formula 5 and Formula 6 include the positions of the positioning satellites 10 and 11, so that it can be regarded that the quality of the navigation information for calculating the positions of the positioning satellites 10 and 11 is also evaluated simultaneously.

In place of the observation residuals such as the lease squares residual of the pseudorange observation value and the residual before observation update of the L1 carrier phase mentioned above, ranging precision information (URA: User Range Accuracy) of each positioning satellite provided by a general differential GNSS (Global Navigation Satellite System) service may be used as the quality evaluation index. The URA can be calculated from a message defined in "RTCM STANDARD 10403.2 Differential GNSS (Global Navigation Satellite Systems) Services—Version 3, Feb. 1, 2013. (pages 11, 81)". When the statistical values of each of clock orbit component, ionospheric, multipath, and tropospheric errors of the positioning satellites 10 and 11 have been obtained, ranging precision information calculated from the above statistical values of the errors may be used, as defined in "Japan Aerospace Exploration Agency, Quasi-Zenith Satellite System User Interface Specification, Nov. 28, 2014, (pages 197-199)".

The shortest time designation unit 115 designates the shortest selection time $t_{shortest}$ which is the shortest time during which each of the positioning satellites 10 and 11 is selected consecutively in time in the plan creation unit 113. The shortest selection time $t_{shortest}$ is determined in accordance with the quality evaluation value of the positioning data of each positioning satellite calculated by the quality evaluation unit 114. Specifically, for example, the shortest time $t_{shortest}$ can be determined by multiplying variance of observation residuals of the positioning satellites 10 and 11 whose observation residuals are less than or equal to a threshold by a proportionality coefficient a, as indicated in the following formula.

[Formula 9]

$$t_{shortest} = a \cdot \frac{1}{n} \sum_{i=1}^{n} \left( v_i - \frac{1}{n} \sum_{i=1}^{n} v_i \right)^2 \quad \text{(Formula 9)}$$

Here, v is an observation residual, and n is the number of the positioning satellites 10 and 11 whose observation residuals are less than or equal to the threshold. In Formula 9, in place of the variance, an average value may be used, a root mean square (RMS) may be used, a maximum value may be used, and other statistical values may be used.

The proportionality coefficient a is given by the following formula, for example, where $\sigma_{rand}[m]$ is the target value of a level of random errors to be reduced by successively processing observation values of the positioning satellites 10 and 11, and $\Delta t$ is a sampling interval.

[Formula 10]

$$a = \frac{\Delta t}{\sigma_{rand}^2} \quad \text{(Formula 10)}$$

(Formula 10) uses the fact that the level of random errors decreases in inverse proportion to the number of observations.

In the calculation of variance of observation residuals, the variance may be calculated from evaluation values of the observation residuals in one epoch which is an interval at which one piece of data is acquired in interferometric positioning. The variance may also be calculated from evaluation values in a time period of the past several seconds to several hours.

The threshold of evaluation values (the threshold of observation residuals when the observation residuals of the positioning satellites whose observation residuals are less than or equal to the threshold are obtained) may be, for example, three times the observation error standard deviation per unit weight calculated from the observation error matrix, or may be three times the standard deviation obtained from the variance value. The observation error standard deviation per unit weight can be obtained, for example, by the following formula.

[Formula 11]

$$\sigma_0 = \frac{1}{\sum_{i=1}^{n} \frac{1}{\sqrt{\lambda_i}}} \quad \text{(Formula 11)}$$

Here, $\lambda_i$ is each eigenvalue of the observation error matrix R diagonalized by unitary transformation. As the shortest selection time, a value based on experience may be given, independently of the evaluation value of the positioning data of each epoch.

When the above-mentioned ranging precision information is used as the quality evaluation index, the shortest time may be, for example, a value obtained by multiplying the maximum value of the ranging precision of positioning satellites whose ranging precision is less than or equal to the threshold by the above-mentioned proportionality coefficient. In addition to the maximum value, other statistical values such as an average value may also be used.

The plan modification unit 116 modifies a plan during the modification time $t_{modify}$ from the current time in accordance with the quality evaluation value. If the positioning satellites 11 included in the plan of the selection combination at the current time includes a positioning satellite whose quality evaluation value of the positioning data output by the quality evaluation unit 114 exceeds the threshold (poor evaluation), that positioning satellite 11 is excluded from the combination during the modification time $t_{modify}$ from the current time, and another positioning satellite 10 not exceeding the threshold and not included in the selection combination is newly added to the combination. If the evaluation value of positioning data has not been acquired, it is handled as if the evaluation value exceeds the threshold. Here, the modification time $t_{modify}$ refers to a time period from the current time to the end time of modification of the plan.

With regard to the modification time $t_{modify}$, in order to make the selection time of the additional selected satellite 11 longer than the shortest selection time without fail, the modification time $t_{modify}$ may be set to the shortest selection time $t_{shortest}$ and the plan may be modified at the time interval of the modification time $t_{modify}$.

[Formula 12]

$$t_{modify} = t_{shortest} \quad \text{(Formula 12)}$$

The modification time $t_{modify}$ may be a selection exclusion time which is a time period from the current time to the nearest time when the satellite is no longer selected. Alternatively, the selection exclusion time and the shortest selection time $t_{shortest}$ may be compared and the maximum value of these may set as the modification time $t_{modify}$.

If the evaluation value of the positioning data of the positioning satellite 10 to be added has not been acquired, the positioning data acquisition unit 111 is executed again to acquire the positioning data of this positioning satellite 10, and the quality evaluation unit 114 is executed again to evaluate the quality of the positioning data. To modify the plan, as in creating a plan by the plan creation unit 113, the precision degradation index based on the geometric arrangement calculated from the position of each positioning satellite 10 is used, and the combination of satellites at each time is modified so that the maximum value of the precision degradation index at each time during the modification time $t_{modify}$ from the current time is minimized. In doing so, the constraint is that the shortest time during which each satellite is selected consecutively in time is longer than the shortest selection time $t_{shortest}$ designated by the shortest time designation unit 115.

The plan storage unit 117 stores a selection plan of a selection combination of the positioning satellites 10 and 11 created by the plan creation unit 113. If the plan modification unit 116 modifies the plan, the stored selection combination plan is overwritten with the modified plan. The selection plan of the positioning satellites 10 and 11 is stored as a data structure under which it is possible to recognize the satellites to be selected at each time from the start time $t_{start}$ to the end time $t_{end}$. For example, a list of satellites may be defined and stored for each time, or a two-dimensional array of the total number of times×the total number of the positioning satellites may be defined, and the value of the [t, i] element of the array may be represented as 1 if the i-th satellite is selected at the t-th time and the value may be represented as 0 if not selected.

The positioning computation unit 118 acquires the combination of the selected positioning satellites 11 from the plan storage unit 117, and performs a computation to measure the position of the positioning target by using the positioning data of the selected satellites 11 included in the selection combination among the positioning data of each satellite acquired from the positioning data acquisition unit 111.

The positioning computation unit 118 calculates the position of the positioning target on which the positioning device 30 is mounted by using pseudorange observation values and carrier phase observation values for four or more positioning satellites 11, the values having been corrected using information on the satellite clock error included in the navigation calendar. As the above-mentioned observation values such as the pseudorange observation values and the carrier phase observation values, it is also possible to use observation values to which error correction values obtained from the outside by being provided by a quasi-zenith satellite or the like have been applied.

The procedure for correcting errors is in accordance with the procedure described in the specifications provided by the institution operating each of the positioning satellites 10 and 11 and each service. For example, when only pseudorange observation values at one frequency are used, the position $x_r$, $y_r$, and $z_r$ of the positioning device 30 and the clock error 64 are estimated by the least squares method indicated below. The y vector is a column vector composed of pseudorange observation values of individual satellites, and the z vector is a column vector composed of state estimation values.

[Formula 13]

$$\vec{z} = [x_r, y_r, z_r, \delta t]^t = (H^T R^{-1} H)^{-1} H^T \vec{y} \quad \text{(Formula 13)}$$

When pseudorange observation values at two frequencies and carrier phase observation values at two frequencies are both used, the position $x_r$, $y_r$ and $z_r$ of the positioning device 30, the clock error $\sigma t_r$, and the ambiguity $N_{L1,r}{}^i$ and $N_{L2,r}{}^i$ for each satellite are estimated by the least squares method as indicated in the following formulas.

[Formula 14]

$$\vec{z} = [x_r, y_r, z_r, \delta t, N_{L1,r}^1, \ldots N_{L1,r}^n, N_{L2,r}^1, \ldots, N_{L2,r}^n]^t = \quad \text{(Formula 14)}$$
$$(H_\Phi^T R^{-1} H_\Phi)^{-1} H_\Phi^T \vec{y}$$

[Formula 15]

$$H_\Phi = \begin{bmatrix} H & O_{n \times n} & O_{n \times n} \\ H & O_{n \times n} & O_{n \times n} \\ H & \lambda_{L1} I_{n \times n} & O_{n \times n} \\ H & O_{n \times n} & \lambda_{L2} I_{n \times n} \end{bmatrix} \quad \text{(Formula 15)}$$

Here, $\lambda_{L1}$ and $\lambda_{L2}$ indicate the wavelength of the L1 carrier wave (0.1903 [m]) and the wavelength of the L2 carrier wave (0.2442 [m]), respectively. The z vector includes the position $x_r$, $y_r$ and $z_r$ of the positioning device 30, the clock error $\sigma t_r$ converted into meters, and the ambiguity $N_r{}^i$ for the i-th positioning satellite i.

By converting the estimated ambiguity into an integer by adopting the LAMBDA (the Least Squares Ambiguity Decorrelation Adjustment) method or the like, the position of the positioning device 3 on the order of centimeters can be obtained. In estimating the state quantity, an estimation filter such as a Kalman filter or the like may be used, in addition to the least squares as described above.

Figure 3:
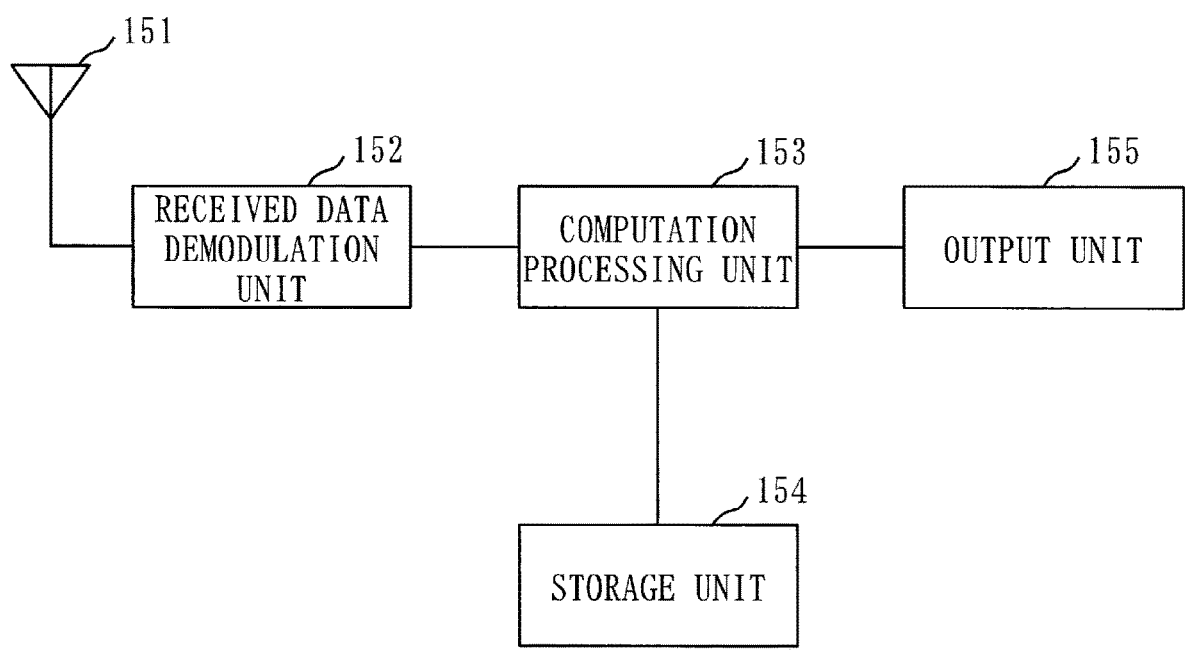
FIG. 3 is a diagram illustrating a hardware configuration of the positioning device according to the first embodiment of the present invention.

FIG. 3 is a diagram illustrating a hardware configuration of the positioning device 30 according to the first embodiment.

In FIG. 3, a positioning antenna 151 receives signals of the positioning satellites 10 and 11. A received data demodulation unit 152 performs amplification, frequency conversion, and the like on the signals received by the positioning antenna 151 to perform AD conversion and digitization, and performs code demodulation and the like. Upon receiving the signals of the received data demodulation unit 152, a computation processing unit 153 performs demodulation of navigation information and computations such as a satellite orbit computation and a position computation. A storage unit 154 temporarily stores data when a computation is performed, or stores data such as a selection combination list. An output unit 155 outputs a result computed by the computation processing unit 153 or data stored in the storage unit 154 to the outside in response to an instruction from the computation processing unit 153. This output is output to a display device such as a display, or provides information to an external device as a signal via an interface. The output includes display of a position on a map.

Description will be given as to which component of the hardware of FIG. 3 implements each unit of FIG. 2. The positioning data acquisition unit 111 is implemented by the positioning antenna 151 and the received data demodulation unit 152. The final navigation information and range observation value are calculated using the computation processing unit 153. Computations of the satellite position calculation unit 112, the quality evaluation unit 114, the shortest time designation unit 115, the plan creation unit 113, the plan modification unit 116, and the positioning computation unit 118 are mainly processed by the computation processing unit 153. Results of the computations processed by the computation processing unit 153, such as positioning data, a quality evaluation value, a shortest selection time, selection combination information, and a positioning computation result, are stored in the storage unit 154. The plan storage unit 117 stores a selection combination plan in the storage unit 154.

The computation processing unit 153 of FIG. 3 may be configured to read a program recorded in the storage unit 154 and perform the processes of the satellite position calculation unit 112, the quality evaluation unit 114, the shortest time designation unit 115, the plan creation unit 113, the plan modification unit 116, and the positioning computation unit 118. A processing circuit to perform the process of each unit may be configured with dedicated hardware, and may be implemented by a single circuit, a composite circuit, a programmed processor, a parallel programmed processor, an ASIC, or an FPGA.

The storage unit 154 corresponds, for example, to a nonvolatile or volatile semiconductor memory such as a RAM, a ROM, a flash memory, an EPROM, and an EEPROM, a magnetic disk, a flexible disk, an optical disk, a compact disk, a mini disk, a DVD, and the like.

Figure 4:
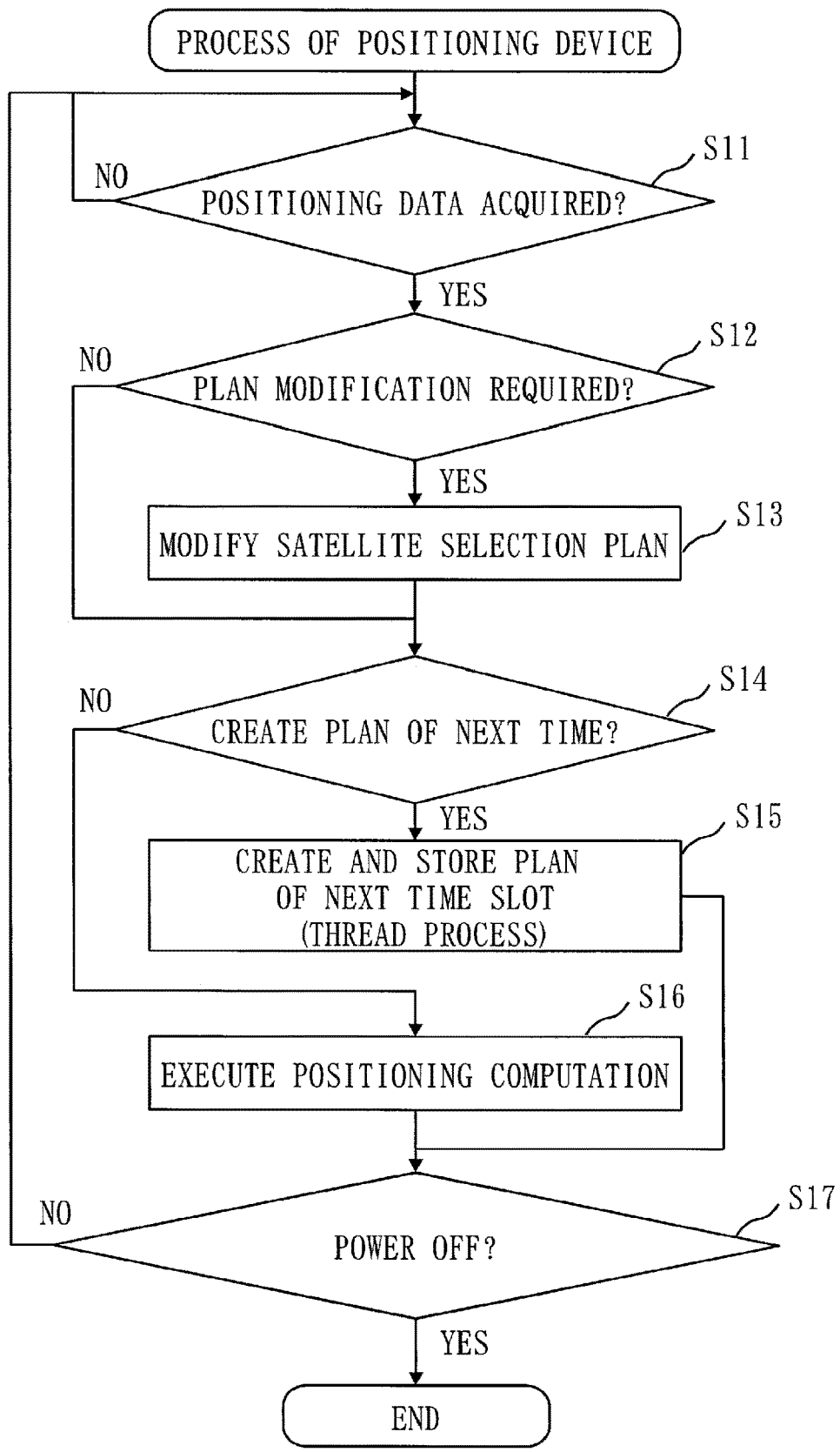
FIG. 4 is a flowchart illustrating an example of a process of the positioning device according to the first embodiment of the present invention.

FIG. 4 is a flowchart illustrating an example of the process of the positioning device 30 according to the first embodiment. The process of the positioning device 30 of FIG. 4 starts when the positioning device 30 is powered on, for example.

If positioning data has not been acquired from the positioning satellites 10 and 11 (step S11; NO), the positioning data acquisition unit 111 repeats step S11 to wait for acquisition of positioning data. If positioning data has been acquired (step S11; YES), the positioning data acquisition unit 111 acquires range observation values for a plurality of the positioning satellites 10 and 11 and navigation information of the positioning satellites 10 and 11.

The quality evaluation unit 114 evaluates the quality of the positioning data of each positioning satellite acquired by the positioning data acquisition unit 111. As a result of the evaluation, if there is a satellite whose quality evaluation value exceeds the threshold among the satellites included in the combination plan at the current time and it is determined that the plan needs to be modified (step S12; YES), the satellite selection combination plan during the modification time $t_{modify}$ from the current time is modified by the plan modification unit 116 (step S13).

In an embodiment in which the processing cycle of the positioning device 30 is short (for example, a cycle of 0.1 seconds) and the plan modification process cannot be completed within the allotted time (for example, 0.05 seconds), the plan modification process may be a thread process independent of the loop and only a process of removing the satellite whose quality evaluation value exceeds the threshold from the selection combination may be performed in the current loop.

Next, if the current time is the time to plan for the next time slot (after the plan end time $t_{end}$) (step S14; YES), the plan creation unit 113 creates a selection combination plan of positioning satellites from the current plan end time $t_{end}$ to a new plan end time $t_{end}'$ (step S15).

The plan uses each satellite position calculated by the satellite position calculation unit 112 and the shortest selection time determined by the shortest time designation unit 115 from the quality of the positioning data. The plan creation process is performed as a thread process independently of the loop in the process of the positioning device 30 in FIG. 4, and after completion of the plan creation process, the selection combination plan is stored in the plan storage unit 117.

Considering that the plan creation process is a thread process, and that there is a possibility that a created new selection combination plan may be modified, it is desirable that the time to plan for the next time slot (after the current plan end time $t_{end}$) be a time earlier than $t_{end}$ by ($t_{planning}$+$t_{modify}$) or longer, where $t_{planning}$ is the time required for creating a plan. The time period from the current plan end time $t_{end}$ to the next new plan end time $t_{end}'$ may be set to one hour, for example.

Next, the positioning computation unit 118 performs a computation to measure the position of the positioning target by using the positioning data of the positioning satellites 11 included in the selection combination among the positioning data of each satellite (step S16). The position of the positioning target may be the position of the positioning device itself.

If the power is not turned off, the process returns to step S11 and step S11 to step S16 are repeated. When the power is turned off, the process ends.

Figure 5:
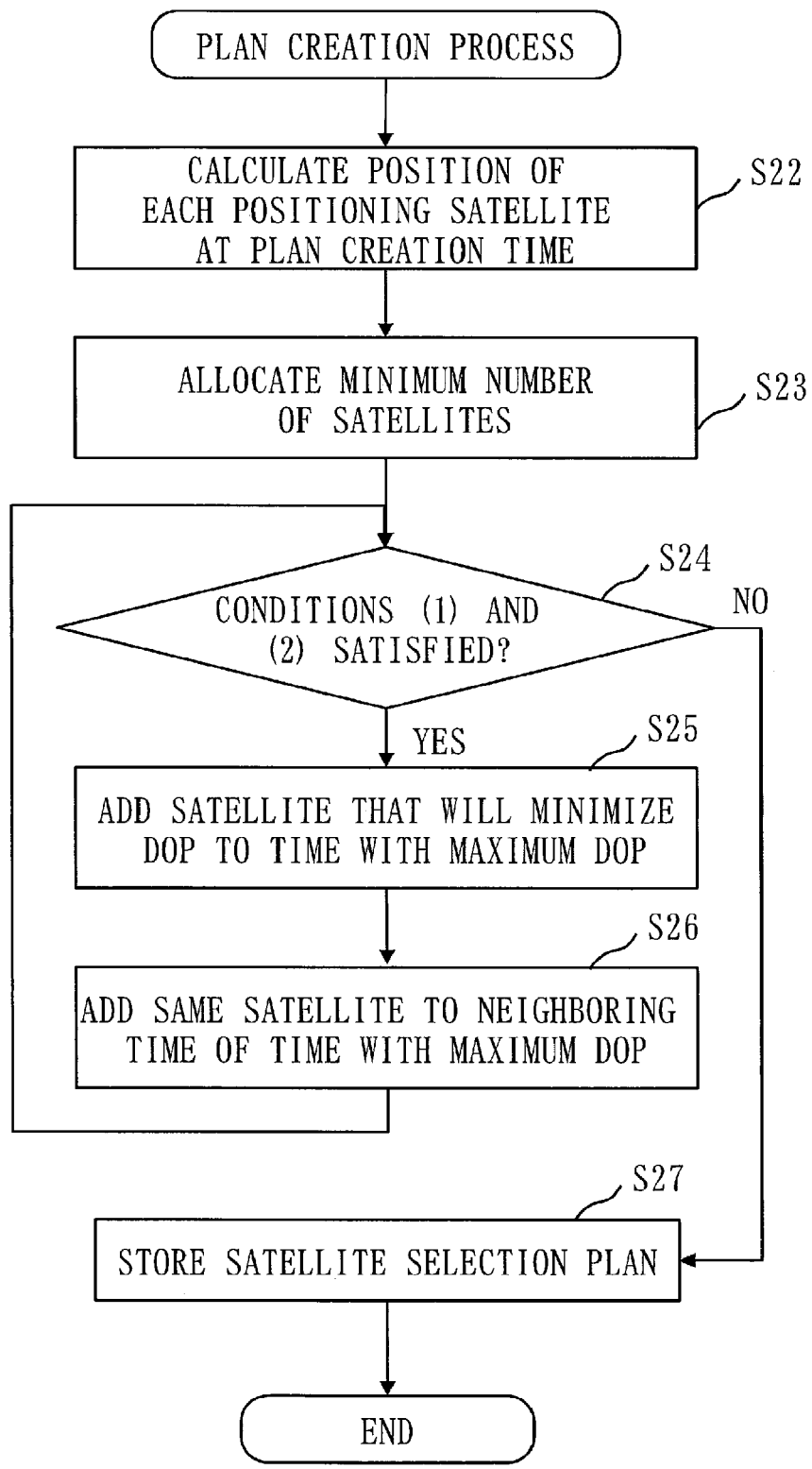
FIG. 5 is a flowchart illustrating an example of a plan creation process according to the first embodiment of the present invention.

FIG. 5 is a flowchart illustrating an example of the process of creating a plan of a selection combination of positioning satellites according to the first embodiment. The plan creation process of FIG. 5 is started when step S15 of FIG. 4 is executed.

The satellite position calculation unit 112 calculates the three-dimensional position of the satellite from the start time $t_{start}$ to the end time $t_{end}$ from the navigation information of each of the positioning satellites 10 and 11 included in the positioning data, and calculates the elevation angle el and the azimuth angle az with respect to the position of the positioning device 30 (step S22).

The following process is a process performed by the plan creation unit 113. The plan creation unit 113 performs a process of adding the positioning satellite 10 having a good geometric arrangement to the selection combination, preferentially from the selection combination at a time at which the precision degradation index based on the geometric arrangement is large, that is, at which the precision deteriorates.

The calculation of the precision degradation index requires at least four positioning satellites, and there is a positioning satellite that is to be a basic component of the combination, such as a quasi-zenith satellite with a high elevation angle of Japan. For these reasons, the positioning satellites 10 which result in the lowest precision degradation index are first allocated to each time, without taking into consideration the final precision degradation index of the selection combination of the positioning satellites 10 (step S23).

For example, the minimum number of the selected positioning satellites 11 may be set to four, and the positioning satellites 10 may be allocated to each time in descending order of the height of the elevation angle. The priority of the positioning satellite system of the positioning satellite 10 to be selected may be changed depending on the region. For example, in Japan, East Asia, and Oceania, only quasi-zenith satellites and GPS satellites with a high elevation angle may be allocated, and in high latitude regions in Europe, only GLONASS satellites with a high elevation angle may be allocated. Generally, a signal from a satellite with a high elevation angle is not easily blocked by a building or the like and also has high quality, regardless of the environment of the positioning terminal.

In allocating the minimum number of satellites (step S23), in order to make the shortest time during which each positioning satellite is selected consecutively in time longer than the shortest selection time $t_{shortest}$ designated by the shortest time designation unit 115, a satellite is allocated in descending order of the height of the elevation angle and then the same satellite is allocated to the combination of a neighboring time.

Figure 6:
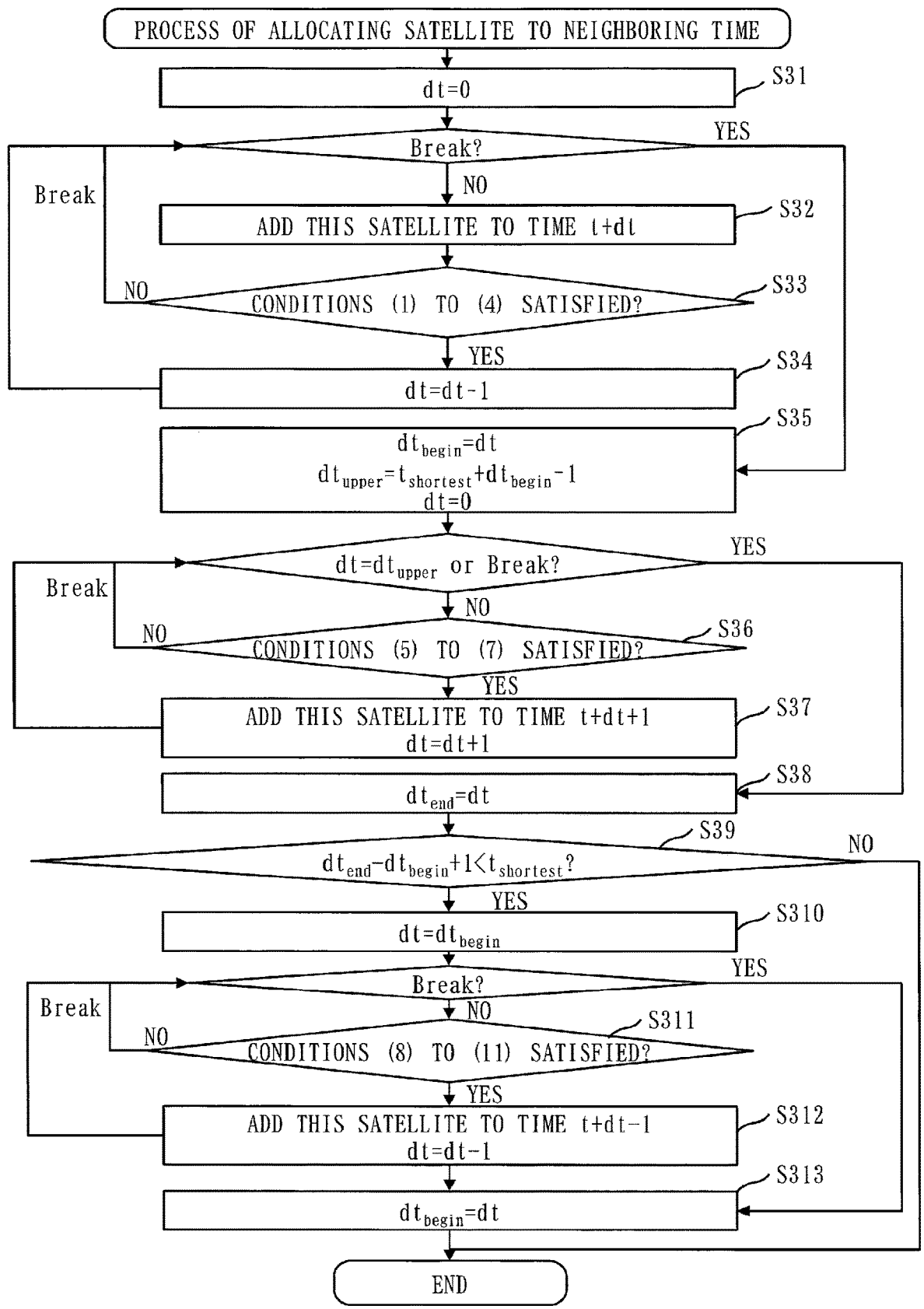
FIG. 6 is a flowchart illustrating an example of a process of allocating the same satellite to a neighboring time of a time to which the satellite is allocated in the plan creation process according to the first embodiment of the present invention.

FIG. 6 is a flowchart illustrating an example of a process, when one positioning satellite p is allocated to a time t, of simultaneously allocating the same positioning satellite p to a neighboring time in the plan creation process according to the first embodiment. It is assumed here that the positioning satellite p is added to the selection combination, and it will be described how a selection combination is determined for an adjacent time slot (hereinafter also called a neighboring time) before or after the time to which the selected positioning satellite p is allocated (how the positioning satellite is added to the neighboring time). The neighboring time is before or after the time to which the selected positioning satellite p is allocated, and its duration is the time interval of the shortest selection time $t_{shortest}$.

The time t is the time to which the positioning satellite 10 is to be allocated. A time difference with respect to the time t is defined as a time difference dt. One unit of the time difference dt is the time interval at which a selection combination of positioning satellites is determined in creating a plan.

In step S31, the process of allocating the satellite to the neighboring time is started with the time difference dt=0. In the flowchart, Break in the next block after step S31 means that the loop ends to return to the higher level process. When passing through this block for the first time, whether or not Break is taken has not been determined, so that the process proceeds directly to NO below.

Next, in step S32, the positioning satellite p is added to the selection combination list of a time t+dt. The allocation of the positioning satellite to the neighboring time is first considered with respect to the time before the time t.

Next, in step S33, it is determined whether all of the following conditions are satisfied.

(1) A time (t+dt−1) is after the start time, the time (t+dt−1) being a time one time interval unit before the time t to which the positioning satellite p is allocated (where one unit is the time interval at which a selection combination is determined).
(2) The positioning satellite p is visible at the time (t+dt−1).
(3) A difference dt−1 between the time t and the time (t+dt−1) is less than or equal to half of the shortest selection time $t_{shortest}$.
(4) At the time (t+dt−1), the number of positioning satellites already allocated is less than the upper limit of the number of positioning satellites to be selected simultaneously.

If the above (1) to (4) are all satisfied (step S33; YES), the process proceeds to step S34, and the time difference dt is set to only one unit before. Accordingly, the time to be considered is a time (t+dt) where dt=dt−1. As long as the above conditions (1) to (4) are satisfied, step S32 to step S34 are repeated. As a result, the positioning satellite p is included in the selection combination list of the time satisfying the above conditions (1) to (4). If the conditions (1), (2), and (4) are satisfied, the positioning satellite p is planned to be included in the selection combination less than or equal to half of the shortest selection time $t_{shortest}$ before the time t at which the positioning satellite p is added.

In step S33, if any one of the above (1) to (4) is not satisfied (step S33; NO), the allocation of the satellite to the time before the time t ends, and the allocation of the satellite to the time after the time t starts. In the flowchart, Break is taken in step S33 to return to the Break determination block, and then Break is determined and the process proceeds to step S35.

In step S35, the current value of dt of the previous loop is recorded in $dt_{begin}$ as the earliest allocation time, and the upper limit $dt_{upper}$ of the latest time is set from the time difference $dt_{begin}$ of the earliest allocation and the shortest selection time $t_{shortest}$. Specifically, it is set as $dt_{upper}=t_{shortest}+dt_{begin}-1$. Lastly, the time difference is returned to dt=0.

In step S36, it is determined whether the following conditions are all satisfied.
(5) A time (t+dt+1) is before the end time, the time (t+dt+1) being a time one unit after the time to which the positioning satellite is allocated.
(6) At the time (t+dt+1), the positioning satellite p is visible.
(7) At the time (t+dt+1), the number of positioning satellites already allocated is less than the upper limit of the number of positioning satellites to be selected simultaneously.

If the above conditions (5) to (7) are all satisfied (step S36; YES), the process proceeds to step S37. In step S37, the positioning satellite p is added to the selection combination list of the time (t+dt+1), and the time difference dt is set to a time one unit after. Specifically, the time difference is set to dt=dt+1. As long as the above conditions (5) to (7) and dt<$dt_{upper}$ are satisfied, step S36 to step S37 are repeated.

As a result, the positioning satellite p is included in the selection combination list of the time satisfying the conditions of the above (5) to (7) and the time difference dt<$dt_{upper}$. If the conditions (5) to (7) are satisfied, the positioning satellite p is planned to be included in the selection combination from the earliest time t+$dt_{begin}$ at which the positioning satellite p is added to the time t+$dt_{upper}$.

If any one of the above (5) to (7) is not satisfied (step S36; NO) or if dt≥$dt_{upper}$, the allocation of the satellite to the time after the time t ends, and the process proceeds to step S38. In step S38, dt at this time point is recorded in $dt_{end}$ as the time difference of the latest allocation time. In the flowchart, Break is taken in step S36 to return to the Break determination block, and then Break is determined and the process proceeds to step S38. If the time difference is more than or equal to the upper limit of the time after (dt≥$dt_{upper}$), the process proceeds to step S38.

In step S33 above, the positioning satellite p is added to the selection combination list of the time t+dt, on the condition that the time difference dt at the time t is less than or equal to half of the shortest selection time $t_{shortest}$ (condition (3)). As a result of checking a time after the time t, there may be a case in which due to, for example, the positioning satellite p becoming invisible, the difference between the time allocation time is shorter than the shortest selection time $t_{shortest}$ in step S38.

Accordingly, in step S39 if the difference between the latest allocation time and the earliest allocation time is shorter than the shortest selection time $t_{shortest}$, it is additionally determined whether or not the positioning satellite p is to be allocated to a time earlier than the earliest time (t+$dt_{begin}$). For this reason, the process proceeds to step S310. In step S39, if the time difference between the latest allocation time and the earliest allocation time is longer than the shortest selection time $t_{shortest}$, the process of allocating the positioning satellite to the neighboring time ends.

If the time difference between the latest allocation time and the earliest allocation time is shorter than the shortest selection time $t_{shortest}$, the process proceeds to step S310. In step S310, if the satellite is allocated additionally to the time earlier than the earliest allocation time t+$dt_{begin}$, dt=$dt_{begin}$ is set.

Next, in step S311, it is determined whether the following conditions are all satisfied.
(8) The time (t+dt−1) one unit before is after the start time.
(9) At the time (t+dt−1), the positioning satellite p is visible.
(10) A difference between the time (t+dt−1) and the latest allocation time $t_{end}$ is less than or equal to the shortest selection time $t_{shortest}$.
(11) At the time (t+dt−1), the number of positioning satellites already allocated is less than the upper limit of the number of positioning satellites to be selected simultaneously.

If the above conditions (8) to (11) are all satisfied (step S311; YES), the process proceeds to step S312. In step S312, the positioning satellite p is added to the selection combination list of the time (t+dt−1), and the time difference dt is set to a time one unit before. As a result, the time to be considered is a time (t+dt) where dt=dt−1. As long as the above conditions (8) to (11) are satisfied, step S311 to step S312 are repeated.

As a result, the positioning satellite p is included in the selection combination list of the time satisfying the above conditions (8) to (11).

If any one of the above conditions (8) to (11) is not satisfied (step S311; NO), the process proceeds to step S313. In step S313, a new time difference dt is assigned to the time difference $dt_{begin}$ of the earliest allocation time, and the process of allocating the positioning satellite to the neighboring time ends.

As described above, the satellite p is added to the selection combinations from the time t+$dt_{begin}$ to the time t+$dt_{end}$ by the process of allocating the satellite to the neighboring time illustrated in FIG. 6.

Next, the process (in and after step S24) after the allocation of the minimum number of satellites (step S23) in the plan creation process of FIG. 5 will be described.

In step S24, if the following conditions are satisfied, the process proceeds to step S25.
(1) From the start time $t_{start}$ to the end time $t_{end}$ for which allocation of selected satellites is to be obtained, there is a time at which the number of selected satellites is less than the upper limit.
(2) At the time at which the number of selected satellites is less than the upper limit selected in (1) above, there is an unselected and visible satellite.

In step S24, if the above conditions (1) and (2) are not satisfied, the process proceeds to step S26.

In step S25, a time with the maximum deterioration index (DOP) of the geometric arrangement of the selected positioning satellites 11 is selected from among the times at which the number of selected satellites is less than the upper limit selected in (1) above. Further, the positioning satellite 10 that will minimize the deterioration index (DOP) by being added to the selection combination is obtained from among the unselected and visible positioning satellites 10 at the time with the maximum deterioration index (DOP) of the geometric arrangement. Next, the positioning satellite which will minimize the deterioration index (DOP) by being added is added to the selection combination list of the time with the maximum deterioration index (DOP).

Next, in step S26, using the process of allocating the positioning satellite to the neighboring time, the same positioning satellite is allocated and added to the selection combination list of the neighboring time of the additional time.

The process from step S24 to step S26 is repeated during a period from the start time $t_{start}$ to the end time $t_{end}$ until there is no longer any time at which the number of selected satellites is less than the upper limit or until there is no longer any unselected and visible positioning satellite at the time at which the number of selected satellites is less than the upper limit. In step S24, if the number of selected positioning satellites has reached the upper limit at all the times or if there is no longer any unselected and visible positioning satellite at the time at which the number of selected satellites is less than the upper limit (step S24; NO), the process proceeds to step S27.

In step S27, the selection combination list is stored in the plan storage unit 117 and the plan creation process ends. In step S27, even when there is a time at which the number of selected positioning satellites is less than the upper limit, if there is no visible satellite that can be added, the satellite selection plan being the selection combination list is overwritten in the plan storage unit 117, and the plan creation process ends. The above is the process performed by the plan creation unit 113.

Figure 7:
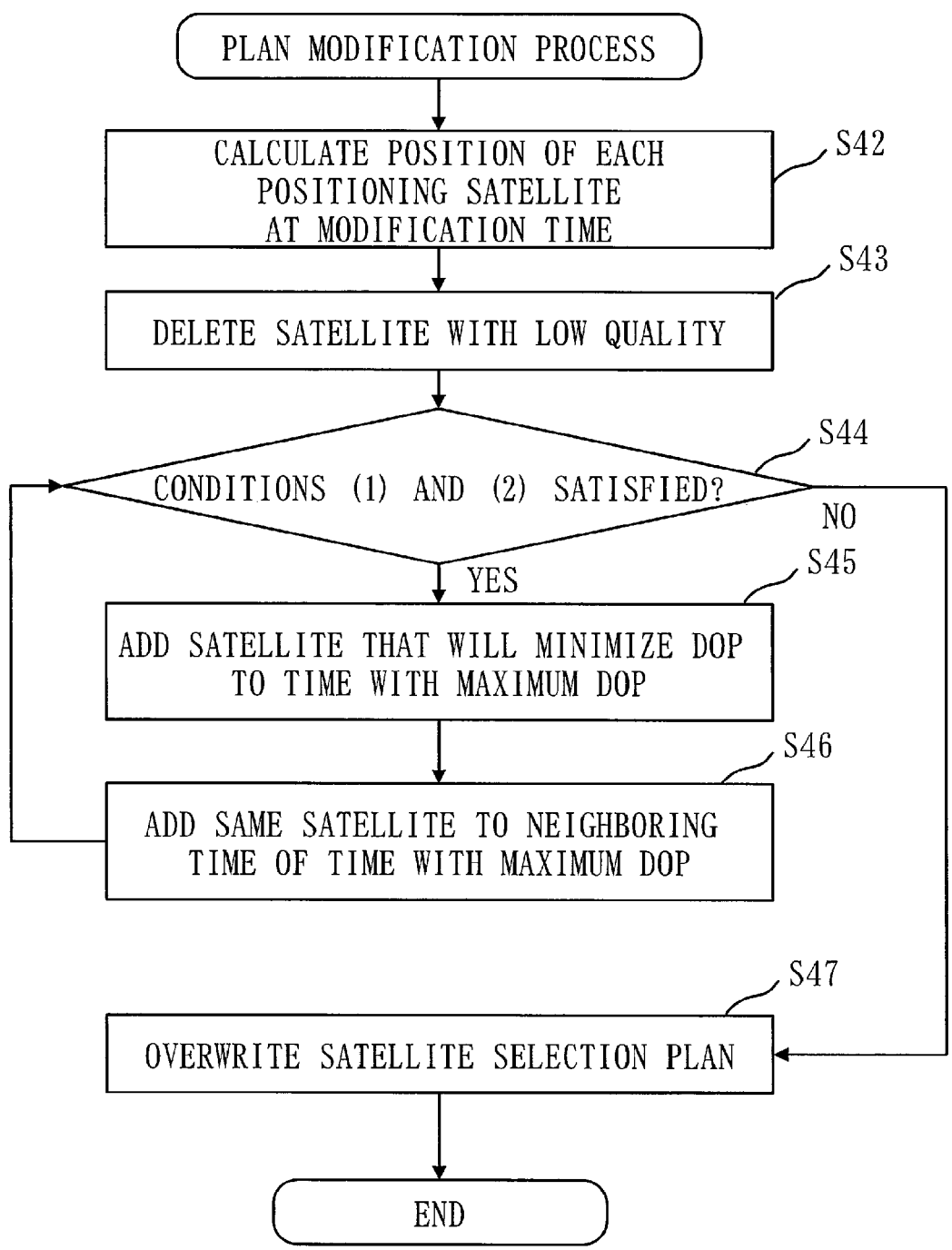
FIG. 7 is a flowchart illustrating an example of a plan modification process according to the first embodiment of the present invention.

Next, FIG. 7 illustrates an example of the process of modifying a satellite combination selection plan according to the first embodiment. The plan modification process of FIG. 7 is started when step S15 of FIG. 4 is executed.

First, in step S42, the satellite position calculation unit 112 is used to calculate the three-dimensional positions of the positioning satellites at times during the modification time $t_{modify}$ from the current time based on the navigation information of each positioning satellite 11 included in the positioning data, and to calculate the elevation angles el and the azimuth angles az with respect to the position of the positioning device 30.

Next, in step S43, the positioning satellite 10 whose evaluation value of the positioning data output by the quality evaluation unit 114 exceeds the threshold, thus having the positioning data of poor quality is excluded from the combination during the modification time $t_{modify}$ from the current time in the current plan.

Next, in step S44, if the following conditions are satisfied (step S44; YES), the process proceeds to step S45.
(1) There is a time at which the number of selected satellites is less than the upper limit during the modification time $t_{modify}$ from the current time.
(2) There is an unselected and visible satellite at one of the times at which the number of selected satellites is less than the upper limit selected in (1) above.
In step S44, if the above conditions (1) and (2) are not satisfied, the process proceeds to step S46.

In step S45, a time with the maximum deterioration index (DOP) of the geometric arrangement based on the selected positioning satellites 11 is selected from among the times at which the number of selected satellites is less than the upper limit selected in (1) above. Further, the positioning satellite 10 that will minimize the deterioration index (DOP) by being added to the selection combination is obtained from among the positioning satellites 10 which are unselected and visible at the time with the maximum deterioration index (DOP) of the geometric arrangement. Next, the positioning satellite that will minimize the deterioration index (DOP) by being added is added to the selection combination list of the time with the maximum deterioration index (DOP). Note that the positioning satellite which has been excluded from the combination in step S43 is not to be added here.

Next, in step S46, using the process of allocating the satellite to the neighboring time (FIG. 6), the same satellite is allocated to the selection combination list of the neighboring time of the time at which the satellite is added.

The process from step S44 to step S46 is repeated during the modification time $t_{modify}$ from the current time until there is no longer any time at which the number of selected satellites is less than the upper limit or until there is no longer any unselected and visible positioning satellite at the time at which the number of selected satellites is less than the upper limit. In step S44, if the number of selected positioning satellites has reached the upper limit at all the times or if there is no longer any unselected and visible positioning satellite at the time at which the number of selected satellites is less than the upper limit (step S44; NO), the process proceeds to step S47.

In step S47, the selection combination list is stored in the plan storage unit 117 and the plan creation process ends. In step 47, even when there is a time at which the number of selected positioning satellites is less than the upper limit, if there is no visible satellite that can be added, the satellite selection plan being the selection combination list is overwritten in the plan storage unit 117 and the plan modification process ends. The above is the process performed by the plan modification unit 116. The process from step S44 to step S47 is substantially the same as the process from step S24 to step S27 of the plan creation unit 113 of FIG. 5, although the target times are different.

In the above, the positioning device 30 has been described. By using the above-described components, it is also possible to configure a positioning satellite selection device 31 that obtains, based on signals transmitted from a plurality of positioning satellites, a selection combination of at each time the positioning satellites to be used for measuring a position.

The positioning satellite selection device 31 includes a positioning data acquisition unit 111 that acquires navigation information and positioning data including a range observation value and an error correction value for the range observation value of a plurality of positioning satellites 10 and 11; a quality evaluation unit 114 that evaluates the quality of the positioning data; a shortest time designation unit 115 that sets a shortest selection time which is the shortest time during which the positioning satellite 11 is selected to a larger value as the quality is poorer; a plan creation unit 113 that obtains a selection combination at each time, on the condition that the positioning satellite is selected for a longer time than the shortest selection time; and a plan storage unit that stores a plan of the selection combination at each time of the positioning satellites. The positioning satellite selection device 31 can be regarded as being composed of the components of the positioning satellite 30 excluding the positioning computation unit 118.

Further, the positioning satellite selection device 31 may be provided with a satellite position calculation unit 112 and a plan modification unit 116.

According to the configuration of the entire system including the positioning device 30 of the first embodiment described above, even when there are restrictions on the number of channels and the positioning computation load, the duration during which a satellite once selected to be used for positioning continues to be selected is longer than the shortest required time in accordance with the quality of the positioning data of the satellite, so that stable positioning can be performed.

In particular, in positioning using the carrier phase observation amount, it is possible to secure the time required for determining the carrier phase ambiguity in accordance with the quality of the positioning data of the satellite and thus perform stable positioning on the order of centimeters.

Second Embodiment

In the first embodiment described above, the positioning device 30 obtains a selection combination of the positioning satellites 11 and measures the position of the positioning target 20. In contrast, a second embodiment describes a positioning system that stably measures a position of a positioning target by using information from a reference station of which the exact position is known and which receives positioning data from a positioning satellite and transmits the received information.

There will be described a positioning system composed of a positioning information transmitting device that uses information from a reference station to obtain and transmit positioning information used in a positioning terminal, and the positioning terminal that receives the information from the positioning information transmitting device and measures a position of a positioning target.

Figure 8:
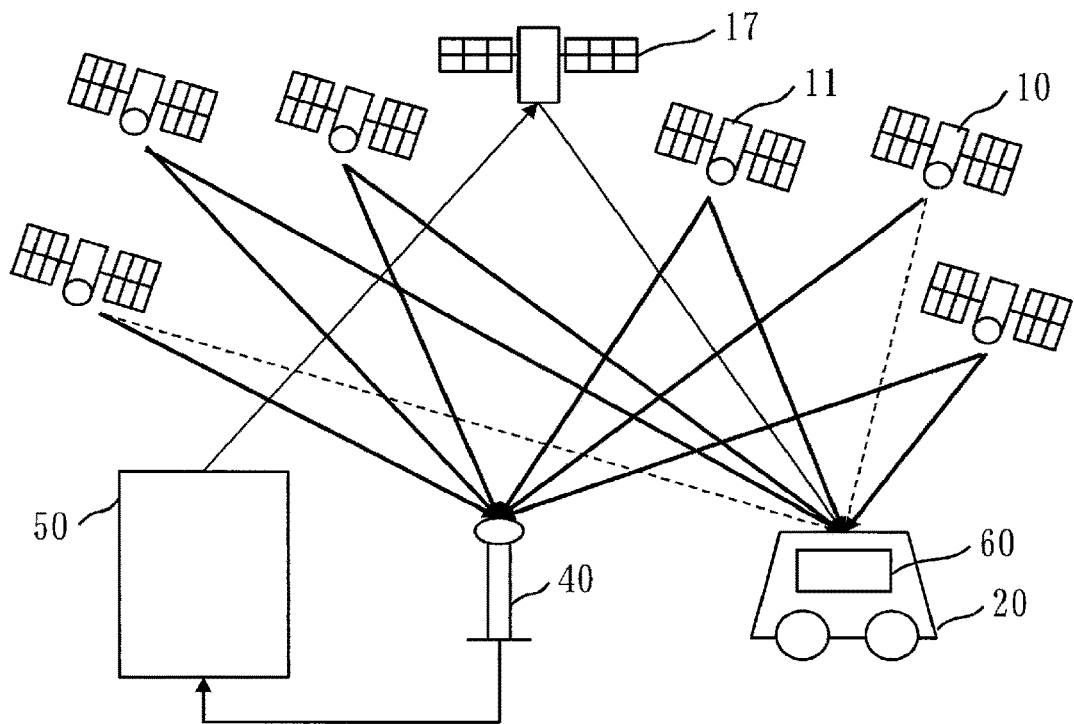
FIG. 8 is a diagram illustrating an example configuration of a positioning system according to a second embodiment of the present invention.

FIG. 8 is a diagram illustrating a configuration of a positioning system 200 according to the second embodiment. In FIG. 8, positioning satellites 10 and 11 are the same as the positioning satellites 10 and 11 of the first embodiment. A reference station 40, of which the exact coordinate position is known, receives positioning data of the positioning satellites 10 and 11, and transmits the positioning data. The positioning system 200 is composed of a positioning information transmitting device 50 that acquires the positioning data received by the reference station 40 and obtains correction data and a selection combination for selecting the positioning satellites 11 to be used for positioning, and a positioning terminal 60 that measures a position of a positioning target 20 from the positioning data received at the position of the positioning target 20, (the selection combination), and the correction data.

It may be configured that the positioning information transmitting device 50 exists independently of the positioning target 20 and the positioning terminal 60 is mounted on the positioning target 20 which is movable.

The correction data can be transmitted from the positioning information transmitting device 50 to the positioning terminal 60 via a multifunctional positioning satellite 17. The multifunctional positioning satellite 17 can deliver information uniformly from a high altitude and thus can transmit the correction data and the like to the positioning terminal 60 existing extensively. Even when the positioning target 20 moves extensively, the positioning terminal 60 mounted on the positioning target can receive the correction data. The multifunctional positioning satellite 17 is on an orbit at a higher altitude than the positioning satellites 10 and 11. For example, the multifunctional positioning satellite 17 may be a so-called quasi-zenith satellite with an orbit passing through the zenith of (directly above) Japan.

Figure 9:
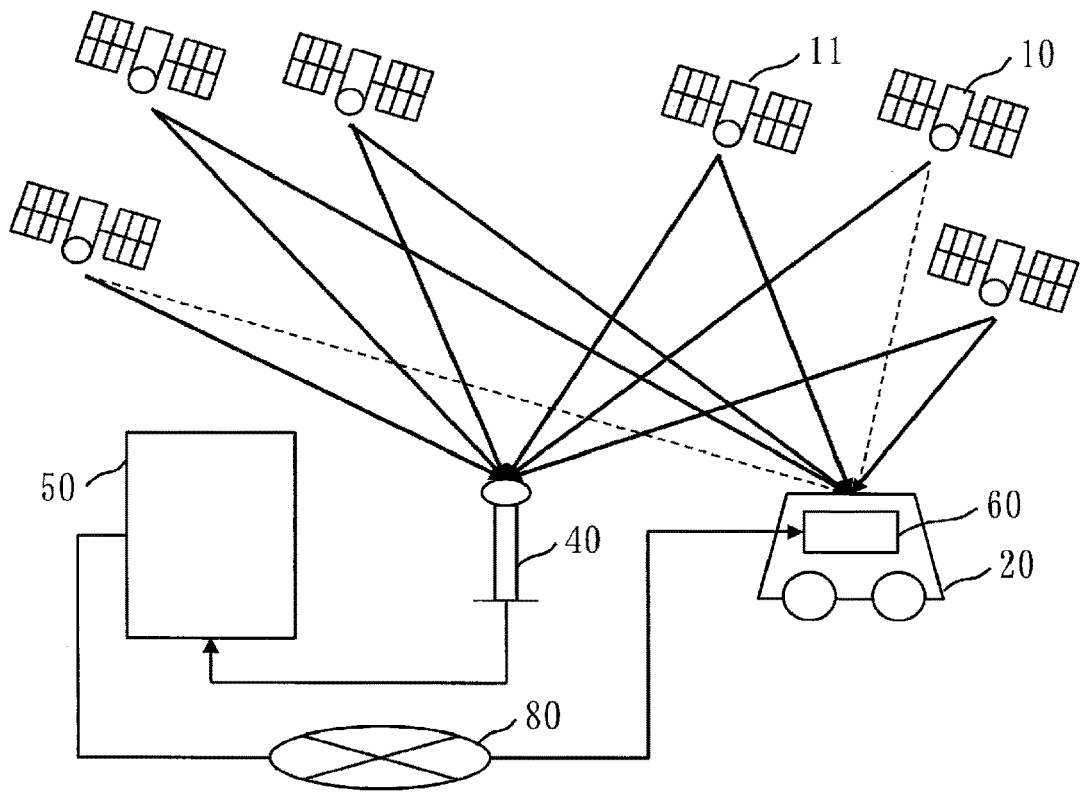
FIG. 9 is a diagram illustrating an example configuration of a positioning system using a communication line according to the second embodiment of the present invention.

FIG. 9 illustrates an example of a configuration in a case where the correction data is transmitted from a positioning information transmitting device 50 to a positioning terminal 60 by a means different from the multifunctional positioning satellite 17 of FIG. 8. In FIG. 9, positioning satellites 10 and 11, a reference station 40, the positioning information transmitting device 50, a positioning target 20, and the positioning terminal 60 are substantially the same as those of FIG. 8. In FIG. 9, the positioning information transmitting device 50 may transmit the correction data to the positioning terminal 60 through a wired or wireless communication line 80 such as the Internet and a public line, instead of via the multifunctional positioning satellite 17. This is suitable for transmitting the correction data in an area where there is no multifunctional positioning satellite 17 such as a quasi-zenith satellite. The positioning information transmitting device 50 and the positioning terminal 60 may be configured to switch from the configuration of FIG. 8 to the configuration of FIG. 9 when the correction data cannot be transmitted and received via the multifunctional positioning satellite 17.

Figure 10:
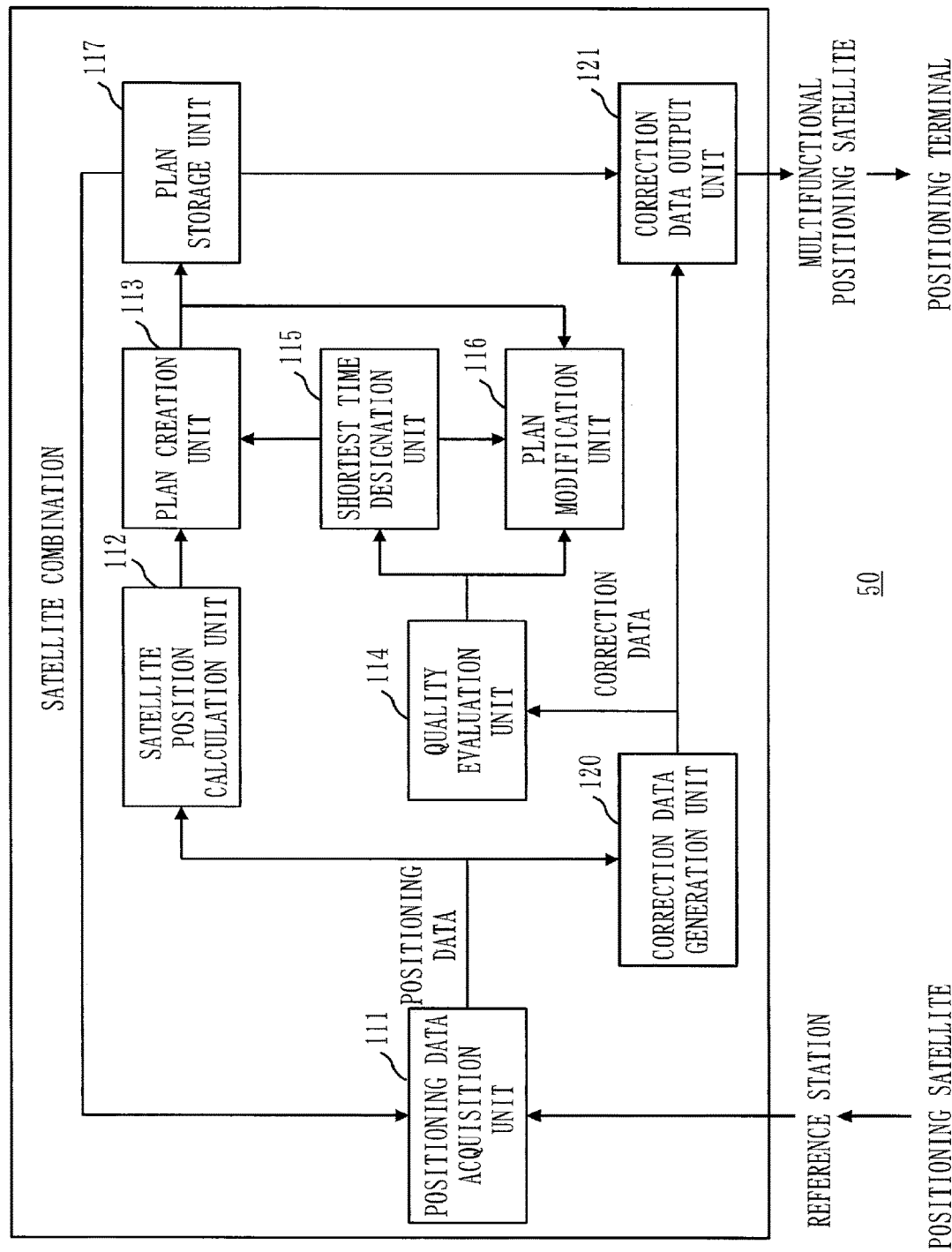
FIG. 10 is a block diagram illustrating an example configuration of a positioning information transmitting device according to the second embodiment of the present invention.

FIG. 10 is a block diagram illustrating an example configuration of the positioning information transmitting device 50 according to the second embodiment. The positioning information transmitting device 50 includes a positioning data acquisition unit 111 that, acquires the positioning data from the reference station 40 which acquires navigation information and positioning data including error information from a plurality of the positioning satellites 10 and 11; a satellite position calculation unit 112 that calculates the positions at each time of the positioning satellites 10 and 11 from the navigation information included in the positioning data; a correction data generation unit 120 that generates correction data for correcting errors included in the positioning data of the positioning satellites 10 and 11; a quality evaluation unit 114 that obtains a quality evaluation value by evaluating the quality of the correction data; a shortest time designation unit 115 that sets a shortest selection time which is the shortest time during which the positioning satellite 11 to be used for positioning is selected to a smaller value as the quality evaluation value is better; a plan creation unit 113 that plans a selection combination at each time of the positioning satellites 11 to be used for positioning on the condition that each positioning satellite 11 is selected for longer than the shortest selection time of the positioning satellites 10 and 11 by using, as an evaluation criterion, a precision degradation index obtained from the geometric arrangement in the sky at each time calculated from the satellite positions of a plurality of the positioning satellites 10 and 11; a plan storage unit 117 that stores the selection combination at each time of the positioning satellites 11; and a correction data output unit 121 that outputs the correction data of the positioning satellites 11 included in the selection combination.

The positioning information transmitting device 50 includes the correction data generation unit 120 and the correction data output unit 121, in addition to the components, excluding the positioning computation unit 118, of the positioning device 30 according to the first embodiment.

The positioning terminal 60 also includes a terminal positioning data acquisition unit 131, a correction data acquisition unit 122, and a positioning computation unit 118.

Using the positioning data acquired from the reference station 40, the positioning information transmitting device 50 generates correction data for correcting an error included in the positioning data acquired by the positioning terminal 60 from the positioning satellite 11, and provides the correction data to the positioning terminal 60 by using a delivery means such as the multifunctional positioning satellite 17.

The positioning terminal 60 performs a measurement computation of the positioning target by using the positioning data acquired from the positioning satellite 11 by the positioning terminal 60 and the correction data acquired from the positioning information transmitting device 50 via the delivery means such as the multifunctional positioning satellite 17.

The positioning terminal 60 includes the correction data acquisition unit 122 that acquires the correction data transmitted from the positioning information transmitting device 50, the terminal positioning data acquisition unit 131 that acquires a range observation value and navigation information of the positioning satellite 11, and the positioning computation unit 118 that calculates a position by using the range observation value which has been corrected with the correction data.

The positioning device 30 according to the first embodiment of the present invention determines a combination of the positioning satellites 10 from which the positioning data acquisition unit 111 acquires positioning data and the positioning satellites 11 to be used for a measurement computation by the positioning computation unit 118, in accordance with the geometric arrangement and the quality of the positioning data of each of the positioning satellites 10 and 11. On the other hand, the positioning system 200 according to the second embodiment determines a combination of satellites for which correction with correction data is to be performed by substantially the same process in accordance with the geometric arrangement and the quality of the positioning data of each of the positioning satellites 10 and 11.

Each unit will be described below.

The positioning data acquisition unit 111 acquires the positioning data of each of the positioning satellites 10 and 11 from the reference station 40. The positioning data may be acquired using a line such as the Internet. The positioning data to be acquired is a range observation value for each of the positioning satellites 10 and 11 and navigation information of the positioning satellites 10 and 11, as in the first embodiment. However, in order to make the correction data valid in a wide area, the positioning data may be acquired from a plurality of the reference stations 40. For example, in Japan, there are about 1,300 reference stations 40 nationwide, so that the positioning data may be acquired from these reference stations.

The operation of the satellite position calculation unit 112 is the same as the operation of the satellite position calculation unit 112 of the positioning device 30 according to the first embodiment. Using the navigation information acquired by the positioning data acquisition unit 111, the satellite position calculation unit 112 calculates the three-dimensional position of a satellite in the sky at an arbitrary time within the planning target time.

As with the plan creation unit 113 of the positioning device 30 according to the first embodiment, the plan creation unit 113 plans selection of a combination of satellites at each time by using the precision degradation index based on the geometric arrangement calculated from the positions of individual satellites, such that the maximum value of the precision degradation index at each time from a start time $t_{start}$ to an end time $t_{end}$ is minimized.

At this time, planning is done under the constraint that the shortest time during which each positioning satellite is selected consecutively in time is longer than a shortest designation time $t_{shortest}$ designated by the shortest time designation unit 115. Note that the position used for calculating an elevation angle $el_i$ and an azimuth angle $az_i$ of a satellite i used for calculating the DOP is the position of the positioning target 20 or the positioning terminal 60 that uses the correction data. When the position of the positioning target 20 is not known or there are a plurality of the positioning targets 20 that use the correction data, the position of the reference station 40 or an average value of the positions of the plurality of the positioning targets 20 may be used. When the positioning data of a plurality of the reference stations 40 is used in order to make the correction data valid in a wide area, the position of a representative point of the target area, such as an average value of the positions of those reference stations 40, may be used.

Further, when the correction data is provided over a wide area (for example, all over Japan) and the values of the precision degradation index based on the geometric arrangement and the visibility status of each satellite vary significantly depending on the location, the area may be divided into a plurality of sub areas and a representative point may be defined for each sub area, and a satellite selection plan may be created for each sub area. For example, Japan can be divided into ten sub areas.

The correction data generation unit 120 generates correction data for correcting errors included in the positioning data of each satellite from the positioning data of the positioning satellites 10 and 11 acquired from the reference station 40 and the known accurate position coordinate values of the reference station 40.

For example, a pseudorange correction value for correcting a pseudorange observation value and a carrier phase correction value for correcting a carrier phase observation value for the positioning satellite 11 are calculated by the following formulas, and the pseudorange correction value and the carrier phase correction value are used as the correction data. As the position coordinate values of the reference station 40, coordinate values obtained separately by stationary surveying or the like may be used, or the daily coordinate values of the electronic reference points provided by an institution such as the Geospatial Information Authority of Japan may be used.

[Formula 16]

$$PRC_r^i = P_r^i - \sqrt{(x^i-x_r)^2+(y^i-y_r)^2+(z^i-z_r)^2}$$

$$CPC_r^i = \Phi_r^i - \sqrt{(x^i-x_r)^2+(y^i-y_r)^2+(z^i-z_r)^2} \quad \text{(Formula 16)}$$

Here, $x^i$, $y^i$, and $z^i$ are the three-dimensional position of a satellite i calculated from the navigation information included in the positioning data, and $x_r$, $y_r$, and $z_r$ are the three-dimensional position of the reference station 40. $P_r^i$ and $\Phi_r^i$ are the pseudorange observation value and the carrier wave observation value, respectively, which are acquired by the r-th reference station 40 for the i-th positioning satellite 11 and which have been corrected by using the information on the satellite clock error included in the navigation calendar of the navigation information. $PRC_r^i$ and $CPC_r^i$ are the pseudorange correction value and the carrier phase correction value, respectively, for the i-th positioning satellite 11.

The method for calculating the satellite position from the navigation information and the procedure for correcting the satellite clock error are in accordance with the procedures described in the specifications provided by the institution operating each of the positioning satellites 10 and 11 or each service.

When the positioning data of a plurality of the reference stations 40 is used, individual correction values calculated by the plurality of the reference stations 40 may be used as the correction data. Further, a surface correction parameter and the like obtained using the surface correction parameter (FKP: Flachen Korrektur Parameter) method may be added to the correction data.

When the positioning data of the plurality of the reference stations 40 is used, individual state quantities such as a precision satellite clock, a precision orbit, an ionospheric delay amount, and a tropospheric delay amount may be estimated from the positioning data by using the method described in "Wubbena, G., A. Bagge, M. Shcmitz (2001). RTK Network based on Geo++GNSMART— Concepts, Implementation, Results. Presented at the International Technical Meeting, ION GPS-01, Salt Lake City, Utah. (pages 2-9)" or the like, and these state quantities may be used as the correction data. Here, the precision satellite clock is a clock based on clock error information with higher precision than the satellite clock error information included in the navigation calendar, and the precision orbit is an orbit based on satellite position information with higher precision than the satellite position calculated from the navigation calendar.

When the positioning information transmitting device 50 performs relative positioning, the pseudorange observation value or the carrier phase observation value acquired from the reference station 40 may be directly used as the correction data.

The pseudorange observation value and the carrier phase observation value at a virtual reference point obtained using the virtual reference point (VRS: virtual reference station) method may also be directly used as the correction data.

The quality evaluation unit 114 evaluates the quality of the correction data, and obtains an index value of the quality of the correction data of each of the positioning satellites 10 and 11. As the evaluation indices of the pseudorange correction value and the carrier phase correction value, for example, the variance of differences in correction values among the epochs obtained in the past several epochs (for example, 5 minutes) may be used, as indicated in the formula below.

[Formula 17]

$$PRC\sigma_r^{i2} CPC\sigma_r^{i2} \qquad \text{(Formula 17)}$$

Generally, when the positioning data is affected by ionospheric disturbance, strong multipath or the like, the variance of time differences of the correction data becomes large, so that quality evaluation using the variance as an index can be performed.

[Formula 18]

$$PRC\sigma_r^{i2}(t) = \qquad \text{(Formula 18)}$$
$$val\left[\bigcup_{k=0}^{N}\{PRC_r^i(t - \Delta t \times k) - PRC_r^i(t - (\Delta t + 1) \times k)\}\right]$$
$$CPC\sigma_r^{i2}(t) =$$
$$val\left[\bigcup_{k=0}^{N}\{CPC_r^i(t - \Delta t \times k) - CPC_r^i(t - (\Delta t + 1) \times k)\}\right]$$

Here, val denotes the variance of values included in U. N is the number of epochs, and $\Delta t$ is the time interval of epochs. PRC is a pseudorange correction amount, CPC is a carrier phase correction amount, i indicates that it is a term related to the satellite, and r indicates that it is a term related to the receiver.

When the positioning data of a plurality of the reference stations 40 is used, the root mean square (RMS) of the differences, at the reference stations 40 close to one another (for example, a plurality of reference stations within a range of 10 km), in the correction values calculated by the individual reference stations 40 may be used. As the value to be evaluated, variance may be used or other statistical values may be used.

[Formula 19]

$$PRCrms^i(t) = rms\left[\bigcup_{r1,r2}(PRC_{r1}^i PRC_{r2}^i)\right] \qquad \text{(Formula 19)}$$
$$CPCrms^i(t) = rms\left[\bigcup_{r1,r2}(CPC_{r1}^i PRC_{r2}^i)\right]$$

Here, i denotes the number of each of the positioning satellites 10 and 11, t denotes the time, r1 denotes a reference station 1, and r2 denotes a reference station 2. Note that rms indicates the root mean square of the values included in U.

As with the shortest time designation unit 115 of the positioning device 30 according to the first embodiment, the shortest time designation unit 115 designates the shortest selection time $t_{shortest}$ during which the positioning satellite 11 is selected consecutively in time in the plan creation unit 113. The shortest selection time $t_{shortest}$ is determined according to the quality evaluation values of the correction data of the positioning satellites 10 and 11 calculated by the quality evaluation unit 114. Specifically, the poorer the quality evaluation value, the larger the value set as the shortest selection time $t_{shortest}$. For example, it may be arranged that the shortest selection time $t_{shortest}$ is changed in accordance with the type (group) of positioning satellites, and the poorer the quality evaluation value for each type of positioning satellites, the larger the value to be set. Alternatively, it may be arranged that the poorer the past quality evaluation value of the positioning satellites 10 and 11, the larger the value to be set.

For example, to determine the shortest selection time $t_{shortest}$, it is considered that the variance of differences in correction values among epochs is used as the quality evaluation value for the pseudorange correction values of the positioning satellites 10 and 11. It is determined by multiplying the maximum value of the evaluation values of the positioning satellites 10 and 11 whose quality evaluation values are less than or equal to the threshold (assuming that a larger value indicates poorer quality) by a proportionality coefficient. The threshold of the quality evaluation value for pseudorange correction values may be, for example, 1.5 m which is three times a random component of an observation error of a pseudorange observation value in general.

[Formula 20]

$$t_{shortest} = a \cdot \max_i PRC\sigma_r^i(t)^2 \qquad \text{(Formula 20)}$$

Here, a denotes a coefficient, i denotes the i-th positioning satellite 10 or 11, r denotes that it is a term related to the receiver, and t denotes the time.

The proportionality coefficient a of Formula 20 is given, for example by the following formula, where $\sigma_{rand}[m]$ is the target value of the level of random errors to be reduced by sequentially processing the observation values of the positioning satellites 10 and 11, and $\Delta t$ is a sampling interval.

[Formula 21]

$$a = \frac{\Delta t}{\sigma_{rand}^2} \quad \text{(Formula 21)}$$

When the positioning terminal 60 performs positioning using the carrier phase observation value, the evaluation value for the carrier phase correction value may be applied similarly. As the threshold of the evaluation value for the carrier phase correction value, a quarter of the carrier wavelength (0.048 [m] for the L1 carrier and 0.061[m] for the L2 carrier) may be used, for example.

As with the plan modification unit 116 of the positioning device 30 according to the first embodiment, the plan modification unit 116 modifies a plan during a modification time $t_{modify}$ from the current time in accordance with the quality evaluation value. If the satellites included in the combination plan at the current time includes a satellite whose evaluation value of the correction data output by the quality evaluation unit 114 exceeds the threshold, that satellite is excluded from the combination during the modification time $t_{modify}$ from the current time, and another satellite not exceeding the threshold and not included in the combination is newly added to the combination. If the evaluation value of the correction data has not been acquired, it is handled as if it exceeds the threshold.

The operation of the plan storage unit 117 is the same as the operation of the plan storage unit 117 of the positioning device 30 according to the first embodiment of the present invention.

The correction data output unit 121 acquires a selection combination of the positioning satellites 11 from the plan storage unit 117, and outputs the correction data of the positioning satellites 11 included in the selection combination among the correction data of each satellite acquired from the correction data generation unit 120. The correction data output by the correction data output unit 121 is provided to the positioning terminal 60 via the delivery means such as the multifunctional positioning satellite 17.

Figure 11:
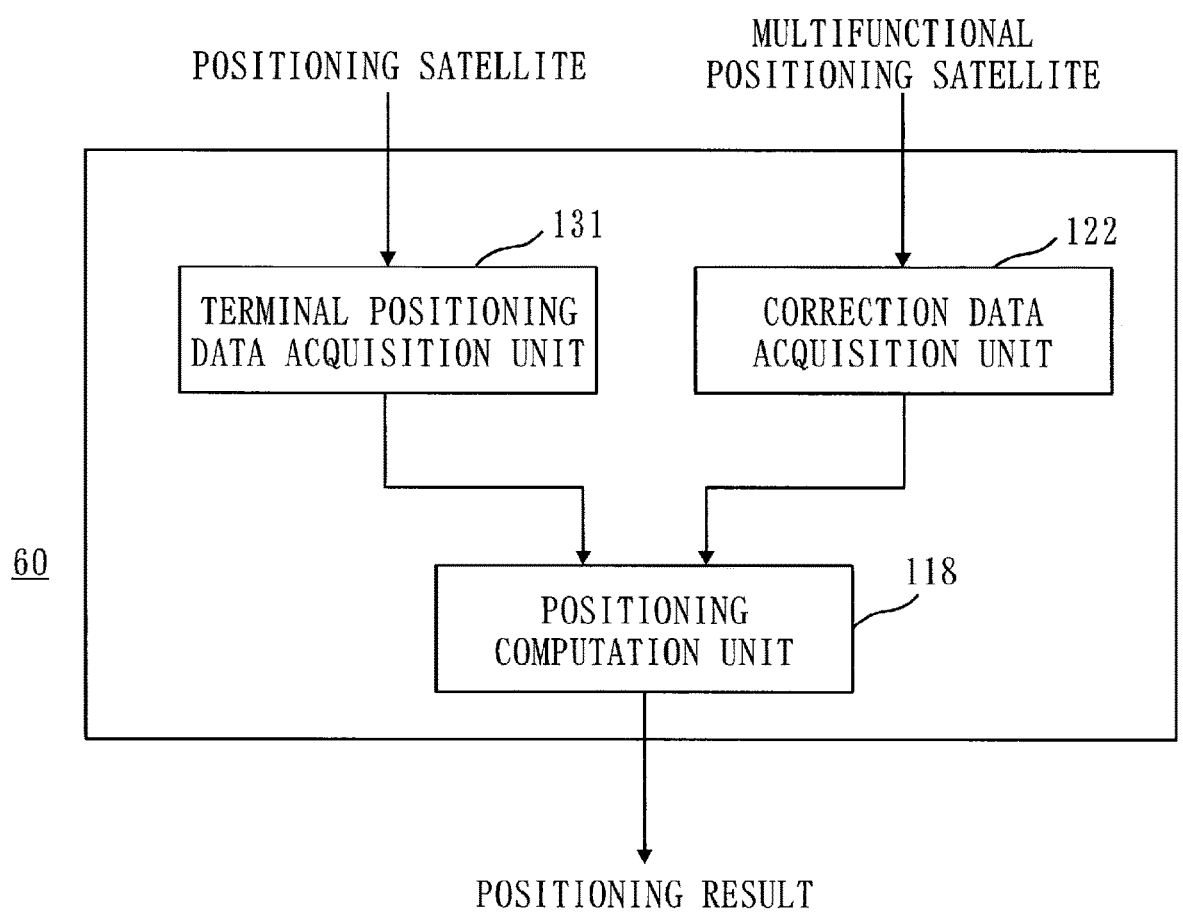
FIG. 11 is a block diagram illustrating an example configuration of a positioning terminal according to the second embodiment of the present invention.

FIG. 11 is a block diagram illustrating an example configuration of the positioning terminal 60 of the positioning system 200 according to the second embodiment. The positioning terminal 60 includes the terminal positioning data acquisition unit 131, the correction data acquisition unit 122, and the positioning computation unit 118.

The terminal positioning data acquisition unit 131 receives a ranging signal transmitted by the positioning satellite 11, and acquires a range observation value for the positioning satellite 11 and navigation information of the positioning satellite 11.

The correction data acquisition unit 122 acquires correction data provided by the positioning information transmitting device 50 via the multifunctional positioning satellite 17. The correction data acquisition unit 122 may be configured to acquire the correction data provided from the positioning information transmitting device 50 through wireless communication, a wireless LAN, or the like via the Internet, instead of the multifunctional positioning satellite 17. This is effective especially in an area where it is not possible to communicate with the multifunctional positioning satellite 17.

The positioning computation unit 118 corrects the range observation value acquired by the terminal positioning data acquisition unit 131 with the correction data acquired by the correction data acquisition unit 122 for the positioning satellite 11 to which the correction data is be used for correction, and calculates the position of the positioning terminal 60 or the positioning target 20 by using the range observation value corrected with the correction data. For the calculation of the position using the corrected range observation value, substantially the same calculation as with the positioning computation unit 118 of the positioning device 30 according to the first embodiment is used.

Figure 12:
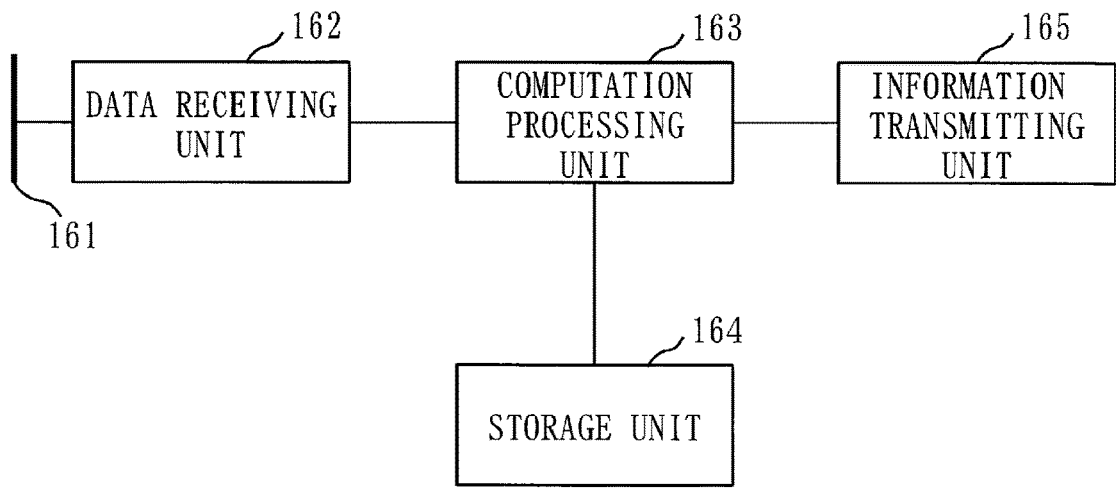
FIG. 12 is a diagram illustrating an example hardware configuration of the positioning information transmitting device according to the second embodiment of the present invention.

FIG. 12 is a diagram illustrating a hardware configuration of the positioning information transmitting device 50 according to this embodiment. In FIG. 12, a data receiving unit 162 receives information from a communication line 161 such as the Internet, a public line, and a leased line. A computation processing unit 163 performs a computation based on data received by the data receiving unit 162 and data stored in a storage unit 164. The storage unit 164 holds information input in advance, and holds temporary data for a process performed by the computation processing unit 163 and resulting data. An information transmitting unit 165 transmits information on a computation result and the like stored in the storage unit 164 to the outside in accordance with an instruction from the computation processing unit 163. The information transmitting unit 165 is configured to transmit information to the multifunctional positioning satellite 17. Alternatively, the information transmitting unit 165 may be configured to transmit information via a communication line such as the Internet, a public line, and a leased line. Further, information may be transmitted by switching between using both and using one of the multifunctional positioning satellite 17 and the communication line.

Description will be given as to which component of the hardware implements each unit of the positioning information transmitting device 50 illustrated in FIG. 10. The positioning data acquisition unit 111 is implemented by the communication line 161 and the data receiving unit 162. The satellite position calculation unit 112, the correction data generation unit 120, the quality evaluation unit 114, the shortest time designation unit 115, the plan creation unit 113, and the plan modification unit 116 are implemented by the computation processing unit 163. Information such as positioning data, correction data, a quality evaluation value, and a selection combination handled by the computation processing unit 163 is held in the storage unit 164 and is read out. The plan storage unit 117 stores a combination list and correction data in the storage unit 164 and reads them out. The correction data output unit 121 transmits information on the combination list and correction data held in the storage unit 164 to the outside through the information transmitting unit 165 in accordance with an instruction from the computation processing unit 163. The information transmitting unit 165 transmits information via the multifunctional positioning satellite 17 and the communication line.

The computation processing unit 163 of FIG. 12 may be configured to read a program stored in the storage unit 164 to perform the processes of the satellite position calculation unit 112, the correction data generation unit 120, the quality evaluation unit 114, the shortest time designation unit 115, the plan creation unit 113, and the plan modification unit 116. A processing circuit to perform the process of each unit may be configured by dedicated hardware, and may be implemented by a single circuit, a composite circuit, a programmed processor, a parallel programmed processor, an ASIC, or an FPGA.

The storage unit 164 corresponds, for example, to a nonvolatile or volatile semiconductor memory such as a RAM, a ROM, a flash memory, an EPROM, and an EEPROM, a magnetic disk, a flexible disk, an optical disk, a compact disk, a mini disk, and a DVD.

Figure 13:
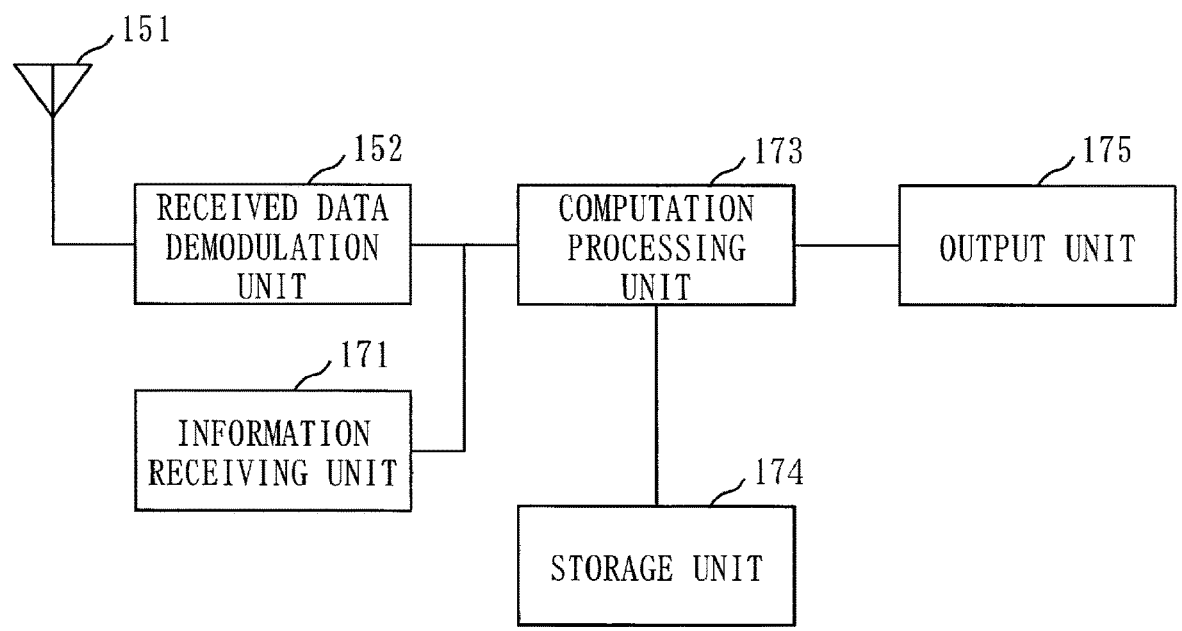
FIG. 13 is a diagram illustrating an example hardware configuration of the positioning terminal according to the second embodiment of the present invention.

FIG. 13 is a diagram illustrating a hardware configuration of the positioning terminal 60 according to this embodiment. In FIG. 13, a positioning antenna 151 receives signals of the positioning satellites 10 and 11. A received data demodulation unit 152 performs amplification, frequency conversion, and the like on the signals received by the positioning antenna 151 to perform AD conversion and digitalization, and performs code modulation and the like. An information receiving unit 171 receives information from the outside. The information receiving unit 171 may be configured to receive information from the multifunctional positioning satellite 17. The information receiving unit 171 may also be configured to receive information via a communication line such as the Internet, a public line, and a leased line. Further, both the multifunctional positioning satellite 17 and the communication line may be prepared, and information may be received by switching between them.

A computation processing unit 173, which receives signals from the received data demodulation unit 152 and information from the information receiving unit 171, performs demodulation of navigation information, computations such as a satellite orbit computation and a position computation, and also performs various types of computation. A storage unit 174 stores temporary data when a computation is performed, or stores data such as a selection combination list. An output unit 175 outputs a result of a computation by the computation processing unit 173 or data stored in the storage unit 174 to the outside in accordance with an instruction from the computation processing unit 173. This output is output to a display device such as a display, or provides information to an external device as a signal via an interface. The output includes display of a position on a map.

Next, description will be given as to which component of the hardware of FIG. 13 implements each unit of FIG. 11. The terminal positioning data acquisition unit 131 is implemented by the positioning antenna 151 and the received data demodulation unit 152. The final navigation information and range observation value are calculated using the computation processing unit 173. The correction data acquisition unit 122 is implemented by the information receiving unit 171. Computations of the positioning computation unit 118 are mainly processed by the computation processing unit 173. Results of the computations processed by the computation processing unit 173, such as positioning data, selection combination information, and positioning computation results, are stored in the storage unit 174. The positioning results computed by the positioning computation unit 118 are output by the output unit 175 to a display device such as a display, and displayed. The display includes display of a position on a map, and also includes output of the positioning results to another system.

The computation processing unit 173 of FIG. 13 may be configured to read a program recoded in the storage unit 174 and to perform the process of the positioning computation unit 118. A processing circuit to perform the process of each unit may be configured with dedicated hardware, and may be implemented by a single circuit, a composite circuit, a programmed processor, a parallel programmed processor, an ASIC, or an FPGA.

The storage unit 174 corresponds, for example, to a nonvolatile or volatile semiconductor memory such as a RAM, a ROM, a flash memory, an EPROM, and an EEPROM, a magnetic disk, a flexible disk, an optical disk, a compact disk, a mini disk, a DVD, and the like.

It has been described above that the correction data acquisition unit 122 acquires data transmitted from the positioning information transmitting device 50. However, it may be configured to also acquire another type of data. For example, there is another system that obtains a different selection combination at each time of the positioning satellites 11 obtained by using the precision degradation index obtained based on the geometric arrangement as the evaluation criterion, instead of adopting the condition that each satellite is selected for longer than the shortest selection time for the positioning satellites 10 and 11. It may be configured to acquire the positioning satellites of the different selection combination at each time of the positioning satellites obtained by this other system by using, as the evaluation criterion, the precision degradation index obtained based on the geometric arrangement, and also acquires the correction data for these positioning satellites.

To acquire the positioning satellites of the different selection combination and the correction data of these positioning satellites mentioned above, it is configured to receive them via the multifunctional positioning satellite 17 and the communication line as described above.

The correction data acquisition unit 122 may be configured to switch between using the positioning satellites 11 of the selection combination and the correction data for these positioning satellites transmitted from the positioning information transmitting device 50 and using the positioning satellites of the different selection combination obtained by the different system by using, as the evaluation criterion, the precision degradation index obtained based on the geometric arrangement without adopting the condition of selecting for longer than the shortest selection time and the correction data for these positioning satellites.

The correction data acquisition unit 122 may also be configured to switch to using the positioning satellites of the different selection combination and the correction data for these different positioning satellites mentioned above, if a signal transmitted from the positioning information transmitting device 50 cannot be received or no signal has been transmitted from the positioning information transmitting device 50 and the current time is past the target time of the positioning satellites of the selection combination already acquired. It is effective when a signal transmitted from the positioning information transmitting device 50 cannot be received for one reason or another.

A terminal quality evaluation unit 132 that obtains a quality evaluation value by evaluating the quality of the positioning data of the terminal positioning data acquisition unit 131 may be provided, and the correction data acquisition unit 122 may be configured to switch to using the positioning satellites of the different selection combination and the correction data for these positioning satellites mentioned above if the quality evaluation values of the positioning data of all of the different positioning satellites of the different selection combination mentioned above are better than the threshold. Conversely, the correction data acquisition unit 122 may be configured to use the correction data for the positioning satellites 11 of the selection combination and the correction data for these positioning satellites transmitted from the positioning information transmitting device 50 if any one of the quality evaluation values of the positioning data of the different positioning satellites of the different selection combination mentioned above is poorer than the threshold.

According to the positioning system 200 of the second embodiment described above, in a positioning service that generates differential error correction information and provides it to a user, the duration during which the positioning satellite 11 once selected as the correction target continues to be selected is longer than the shortest selection time in accordance with the quality of the positioning data of the satellite, so that stable positioning can be performed by the positioning terminal 60. This is effective especially when there is a restriction, in accordance with the line capacity, on the number of satellites that can be used as the error correction target.

In particular, the positioning system 200 of the second embodiment can secure the time required for determining the carrier phase ambiguity in accordance with the quality of the positioning data of the satellite, and perform stable positioning on the order of centimeters.

REFERENCE SIGNS LIST

10: positioning satellite, 11: selected positioning satellite, 17: multifunctional positioning satellite, 20: positioning target, 30: positioning device, 31: positioning satellite selection device, 40: reference station, 50: positioning information transmitting device, 60: terminal-side positioning device, 111: positioning data acquisition unit, 112: satellite position calculation unit, 113: plan creation unit, 114: quality evaluation unit, 115: shortest time designation unit, 116: plan modification unit, 117: plan storage unit, 118: positioning computation unit, 120: correction data generation unit, 121: correction data output unit, 122: correction data acquisition unit, 131: terminal positioning data acquisition unit, 200: positioning system.

The invention claimed is:

1. A positioning system comprising:
a positioning information transmitting device comprising:
one or more computation processors configured to operate as:
  a positioning data acquisition unit to acquire positioning data from a reference station which acquires from a plurality of positioning satellites the positioning data including respective range observation values and navigation information of each respective positioning satellite;
  a satellite position calculation unit to calculate respective satellite positions at each time of the respective positioning satellites from the navigation information included in the positioning data;
  a correction data generation unit to generate correction data for correcting an error included in the positioning data of the positioning satellites;
  a quality evaluation unit to obtain a quality evaluation value by evaluating quality of the correction data;
  a shortest time designation unit to set a shortest selection time which is a shortest time during which the positioning satellites are selected consecutively in time to a larger value as the quality evaluation value is poorer;
  a plan creation unit to allocate a minimum number of positioning satellites for a selection combination of the positioning satellites, and to obtain the selection combination at each time of the positioning satellites to be used for positioning on conditions (1) and (2) of selecting for longer than the shortest selection time of the positioning satellite, by using, as an evaluation criterion, a precision degradation index obtained from a geometric arrangement in the sky at each time calculated from the satellite positions of the minimum number of the positioning satellites, (1) select and add an unselected positioning satellite that will best enhance the precision degradation index to the selection combination a time at which a number of selected satellites is less than an upper limit and the precision degradation index is poorest, and (2) if the unselected positioning satellite is determined by the positioning data acquisition unit to be visible at one of neighboring times before and after the time, further select the unselected positioning satellite for longer than the shortest selection time to be part of the selection combination; and
  a correction data output unit to output the positioning satellites included in the selection combination at each time and the correction data for these positioning satellites;
the positioning information transmitting device outputting the positioning satellites included in the selection combination at each time of the positioning satellites and correction data for correcting an error included in the positioning data of the positioning satellites; and
a positioning terminal including a correction data acquisition unit to acquire from the positioning information transmitting device the positioning satellites included in a selection combination at each time of the positioning satellites, and correction data for correcting an error included in positioning data of these positioning satellites; a terminal positioning data acquisition unit to acquire positioning data including range observation values of the positioning satellites in the selection combination at each time; and a positioning computation unit to calculate a position at each time by using corrected range observation values obtained by correcting the range observation values of the positioning satellites with the correction data of the positioning satellites acquired by the correction data acquisition unit.

2. The positioning system according to claim 1, wherein the plan creation unit selects the unselected positioning satellite further on condition (3) for which an interval of time from a latest time to an earliest time to which the unselected positioning satellite has already been allocated is shorter than the shortest selection time, and adds the unselected positioning satellite to a time at the interval of time.

3. The positioning system according to claim 1, wherein the quality evaluation unit obtains the quality evaluation value by using one of an observation residual when the position is calculated using an observation value of the unselected positioning satellite, ranging precision information of the positioning satellites, and a standard deviation of differences in error correction values of the positioning satellites in each epoch, and
wherein the shortest time designation unit sets the shortest selection time to a value obtained based on a proportionality coefficient obtained from an error level target value and a sampling interval.

4. The positioning system according to claim 3, wherein the proportionality coefficient of the shortest time designation unit is a value obtained by dividing the sampling interval by a square of the error level target value.

5. The positioning system according to claim 1, wherein the plan creation unit selects as the minimum number of positioning satellites four or more visible positioning satellites sequentially from a satellite with a highest elevation angle, and generates an initial selection combination list of the four or more visible positioning satellites.

6. The positioning system according to claim 1, wherein the plan creation unit is executed as a thread process, and starts the process a predetermine time before a plan end time of an existing plan.

7. The positioning system according to claim 1, wherein the correction data output unit outputs the correction data to a positioning terminal via a multifunctional positioning satellite.

8. A positioning system comprising:

a positioning information transmitting device comprising:

one or more computation processors configured to operate as:

a positioning data acquisition unit to acquire positioning data from a reference station which acquires from a plurality of positioning satellites the positioning data including respective range observation values and navigation information of each respective positioning satellite;

a satellite position calculation unit to calculate respective satellite positions at each time of the respective positioning satellites from the navigation information included in the positioning data;

a correction data generation unit to generate correction data for correcting an error included in the positioning data of the positioning satellites;

a quality evaluation unit to obtain a quality evaluation value by evaluating quality of the correction data;

a shortest time designation unit to set a shortest selection time which is a shortest time during which the positioning satellites are selected consecutively in time to a larger value as the quality evaluation value is poorer;

a plan creation unit to allocate a minimum number of positioning satellites for a selection combination of the positioning satellites, and to obtain the selection combination at each time of the positioning satellites on a condition of selecting for longer than the shortest selection time by using, as an evaluation criterion, a precision degradation index obtained from a geometric arrangement in the sky at each time calculated from the satellite positions of the minimum number of the positioning satellites;

a plan modification unit to delete a previously selected positioning satellite from the selection combination based on the quality evaluation value, or add an unselected positioning satellite which is determined by the positioning data acquisition unit to be visible to the selection combination based on the precision degradation index; and a correction data output unit to output the positioning satellites included in the selection combination at each time and the correction data for these positioning satellites;

the positioning information transmitting device outputting the positioning satellites included in the selection combination at each time of the positioning satellites and correction data for correcting an error included in the positioning data of the positioning satellites; and a positioning terminal including a correction data acquisition unit to acquire from the positioning information transmitting device the positioning satellites included in a selection combination at each time of the positioning satellites, and correction data for correcting an error included in positioning data of these positioning satellites; a terminal positioning data acquisition unit to acquire positioning data including range observation values of the positioning satellites in the selection combination at each time; and a positioning computation unit to calculate a position at each time by using corrected range observation values obtained by correcting the range observation values of the positioning satellites with the correction data of the positioning satellites acquired by the correction data acquisition unit.

9. The positioning system according to claim 8, wherein the quality evaluation unit obtains the quality evaluation value by using one of an observation residual when the position is calculated using an observation value of the unselected positioning satellite, ranging precision information of the positioning satellites, and a standard deviation of differences in error correction values of the positioning satellites in each epoch, and wherein the shortest time designation unit sets the shortest selection time to a value obtained based on a proportionality coefficient obtained from an error level target value and a sampling interval.

10. The positioning system according to claim 8, wherein the plan creation unit selects as the minimum number of positioning satellites four or more visible positioning satellites sequentially from a satellite with a highest elevation angle, and generates a selection combination list of the four or more visible positioning satellites.

11. The positioning system according to claim 8, wherein the plan creation unit is executed as a thread process, and starts the process a predetermine time before a plan end time of an existing plan.

12. The positioning system according to claim 8, wherein the correction data output unit outputs the correction data to a positioning terminal via a multifunctional positioning satellite.

* * * * *